US012733756B2

(12) United States Patent
Shatara et al.

(10) Patent No.: US 12,733,756 B2

(45) Date of Patent: Sep. 15, 2026

(54) RELEASABLE MOUNTING MECHANISM FOR SLATWALL

(71) Applicant: NewAge Products Inc., Toronto (CA)

(72) Inventors: Margaret Shatara, Toronto (CA); Luiz Guilherme Leal dos Santos, Markham (CA); Angelo Giovannone, Bolton (CA); Robert Vandenham, Woodbridge (CA)

(73) Assignee: NewAge Products Inc., Toronto (CA)

( * ) Notice: Subject to any disclaimer, the term of this patent is extended or adjusted under 35 U.S.C. 154(b) by 415 days.

(21) Appl. No.: 18/131,915

(22) Filed: Apr. 7, 2023

(65) Prior Publication Data

US 2024/0337349 A1 Oct. 10, 2024

(51) Int. Cl.

*F16M 13/02* (2006.01)
*A47F 5/00* (2006.01)
*A47F 5/08* (2006.01)

(52) U.S. Cl.

CPC .......... *A47F 5/0853* (2013.01); *A47F 5/0846* (2013.01); *F16M 13/02* (2013.01)

(58) Field of Classification Search

CPC .... F16M 13/02; F16M 13/022; A47F 5/0007; A47F 5/0807; A47F 5/0846; A47F 5/0853

See application file for complete search history.

(56) References Cited

U.S. PATENT DOCUMENTS 1,214,795 A * 2/1917 Kinkelaar .............. A47G 25/10 211/32

2,841,353 A 7/1958 Burdick (Continued)

FOREIGN PATENT DOCUMENTS

AU 2010241261 A1 5/2012
AU 2015101015 B4 9/2018

(Continued)

OTHER PUBLICATIONS

Amazon, "Handiwall 8" Double Hook Locking Bracket for Tool Storage on Garage Slatwall Panels (Case of 6)", https://www.amazon.ca/HandiWall-Locking-Bracket-Storage-Slatwall/dp/B09BD6SVQK/ref=sr_1_223?dchild=1&keywords=Slatwall+Hooks&qid=1635196194&sr=8-223, 1996-2023, 5 pages.

(Continued)

*Primary Examiner* — Jonathan Liu

*Assistant Examiner* — Guang H Guan

(74) *Attorney, Agent, or Firm* — Howard & Howard Attorneys PLLC

(57) ABSTRACT

A mounting mechanism for supporting an accessory on a slatwall includes a mounting bracket including a body portion having first and second ends each configured to be received and retained within the channel of a respective groove in the slatwall. The mounting bracket extends between first and second ends and includes a central region defining a central opening. The mechanism also optionally includes a bezel retained within the central opening and a latch at least partially disposed within the central opening and pivotally coupled to the mounting bracket and moveable between retaining and release positions. The mechanism includes a biasing member coupled to the latch configured to bias the latch in the retaining position. The latch is configured to engage the channel of a second groove when the mounting bracket is disposed within the first groove and when the latch is in the retaining position.

16 Claims, 12 Drawing Sheets

(56) References Cited

U.S. PATENT DOCUMENTS 3,045,961 A 7/1962 Cygan
3,172,540 A 3/1965 Berge
3,289,993 A 12/1966 Thalenfeld
3,409,260 A 11/1968 Bleed
3,484,069 A 12/1969 Larson
3,891,172 A 6/1975 Einhorn
4,308,961 A 1/1982 Kunce
4,362,249 A 12/1982 Thalenfeld
4,441,619 A 4/1984 Gibitz
4,448,337 A 5/1984 Cronce
4,452,360 A 6/1984 Barnes
4,501,386 A 2/1985 Rasor et al.
4,506,856 A 3/1985 Rich et al.
4,512,481 A 4/1985 Thalenfeld
4,516,681 A 5/1985 Jahel
4,531,331 A 7/1985 Itagaki
4,618,192 A 10/1986 Kelley
4,629,076 A 12/1986 Amstutz et al.
4,678,151 A 7/1987 Radek
4,679,368 A 7/1987 Pettinga et al.
4,688,683 A 8/1987 Thalenfeld et al.
4,708,311 A 11/1987 Clausen et al.
4,726,554 A 2/1988 Sorrell
4,787,768 A 11/1988 Lange
4,805,784 A 2/1989 Solheim et al.
4,809,479 A 3/1989 Tierno et al.
4,830,203 A 5/1989 Ennis
4,852,213 A 8/1989 Shewchuk
4,869,378 A 9/1989 Miller
4,903,928 A 2/1990 Shell
4,941,632 A 7/1990 Couls et al.
4,944,416 A 7/1990 Petersen et al.
4,961,295 A 10/1990 Kosch, Sr. et al.
D315,093 S 3/1991 Hanna
5,009,381 A 4/1991 Hermanson
5,078,276 A 1/1992 Rogge et al.
5,109,993 A 5/1992 Hutchison
5,125,518 A 6/1992 Ward
5,165,640 A 11/1992 Williams, III
5,180,128 A 1/1993 Massey
5,271,649 A 12/1993 Gromotka
5,337,903 A 8/1994 Wolcovitch et al.
5,356,104 A 10/1994 Rosenberg et al.
5,372,344 A 12/1994 Syvuk
5,379,976 A 1/1995 DeGirolamo
5,409,120 A 4/1995 Miller et al.
5,412,912 A 5/1995 Alves
5,433,413 A 7/1995 Adams
5,472,167 A 12/1995 Shillington et al.
5,485,933 A 1/1996 Crooymans
5,676,258 A 10/1997 Leyden et al.
5,839,589 A 11/1998 Hillard
5,938,158 A 8/1999 Tisbo
5,941,026 A 8/1999 Eisenreich et al.
5,944,203 A 8/1999 Vlah et al.
5,944,294 A 8/1999 Baer
6,019,328 A 2/2000 Allen
6,050,426 A 4/2000 Leurdijk
6,119,878 A 9/2000 Zen
6,186,455 B1 2/2001 Hollingsworth et al.
6,311,854 B1 11/2001 Anderson
6,325,223 B1 12/2001 Hannen
6,349,507 B1 2/2002 Muellerliele
6,349,909 B1 2/2002 Zarrow et al.
6,393,877 B1 5/2002 Church
6,421,961 B1 7/2002 Mallozzi
6,484,985 B1 11/2002 Heltzer
D470,395 S 2/2003 Valiulis et al.
D473,664 S 4/2003 Perkins et al.
6,561,474 B1 5/2003 Walter et al.
6,578,498 B1 6/2003 Draudt et al.
6,601,808 B1 8/2003 Nagel
6,676,176 B1 1/2004 Quandt
6,749,161 B1 6/2004 Will et al.
6,763,957 B1 7/2004 Mullerleile
D494,842 S 8/2004 Perkins et al.
6,772,890 B2 8/2004 Campbell et al.
D497,306 S 10/2004 Anderson et al.
D497,794 S 11/2004 Anderson et al.
D498,631 S 11/2004 Anderson et al.
6,811,043 B2 11/2004 Perkins et al.
D499,922 S 12/2004 Anderson et al.
6,837,384 B2 1/2005 Secondino
D502,865 S 3/2005 Anderson et al.
D508,321 S 8/2005 Anderson et al.
D511,677 S 11/2005 DeBiasio, Jr. et al.
6,971,614 B2 12/2005 Fischer et al.
D516,413 S 3/2006 Anderson et al.
D516,899 S 3/2006 Anderson et al.
7,014,052 B2 3/2006 Dettorre et al.
7,086,542 B2 8/2006 Tomonari et al.
D532,680 S 11/2006 Jackson
7,147,196 B2 12/2006 Knight et al.
7,178,678 B2 2/2007 Mansfield et al.
7,228,977 B2 6/2007 Perkins et al.
D549,562 S 8/2007 Browne et al.
D549,563 S 8/2007 Browne et al.
D553,481 S 10/2007 Kubota
7,296,695 B2 11/2007 Perkins et al.
7,306,107 B2 12/2007 Secondino
7,427,053 B2 9/2008 Nawrocki
D580,744 S 11/2008 Shaha et al.
D580,745 S 11/2008 Shaha et al.
D582,259 S 12/2008 DeBiasio, Jr.
7,527,156 B2 5/2009 Wisnoski et al.
7,669,822 B2 3/2010 Kluge et al.
7,686,172 B2 3/2010 Wisnoski et al.
7,717,279 B2 5/2010 Lawson
7,753,217 B2 7/2010 Lawson
7,757,869 B2 7/2010 Lawson
D624,759 S 10/2010 Jacobson et al.
7,806,279 B2 10/2010 Kubota
7,823,853 B2 11/2010 Larson et al.
7,891,617 B2 2/2011 Tisbo
7,954,651 B2 6/2011 Kao
8,002,225 B1 8/2011 Malone
8,016,138 B2 9/2011 Jacobson et al.
8,028,966 B2 10/2011 Chen
D648,448 S 11/2011 Apgood, II et al.
D649,267 S 11/2011 Apgood, II et al.
8,061,537 B2 11/2011 Nilsson et al.
8,114,226 B2 2/2012 Ernst et al.
8,146,754 B2 4/2012 Apgood, II et al.
8,177,079 B2 5/2012 Schwartzkopf et al.
8,177,311 B2 5/2012 Apgood, II et al.
8,191,845 B1 6/2012 Yu
8,240,623 B2 8/2012 Collins et al.
8,267,363 B2 9/2012 Begic et al.
8,302,923 B2 11/2012 Johnston et al.
8,341,987 B2 1/2013 Nagelski
8,528,871 B2 9/2013 Begic et al.
8,573,415 B2 11/2013 Ernst et al.
8,615,951 B2 12/2013 Kosch
8,662,322 B2 3/2014 Magnusson et al.
8,714,374 B2 5/2014 Bauchet et al.
8,733,562 B2 5/2014 Kao
8,763,312 B2 7/2014 Carter
8,800,212 B2 8/2014 Thrush
8,844,886 B2 9/2014 Mejia et al.
8,985,654 B2 3/2015 Marshall
9,125,502 B2 9/2015 Gwag
9,182,076 B2 11/2015 Simon et al.
D756,755 S 5/2016 Kuehn
9,366,275 B2 6/2016 Simon
D762,777 S 8/2016 Szucs et al.
9,439,521 B2 9/2016 Casali et al.
9,440,694 B2 9/2016 Hudson, Jr. et al.
9,504,335 B2 11/2016 Vainberg et al.
9,515,458 B2 12/2016 Lütze et al.
9,537,275 B2 1/2017 Ewing et al.
D782,265 S 3/2017 Szucs et al.
D783,380 S 4/2017 Szucs et al.
9,611,975 B2 4/2017 Chinn et al.
D786,052 S 5/2017 Szucs et al.

(56) References Cited

U.S. PATENT DOCUMENTS 9,657,890 B2 5/2017 Botello et al.
9,763,528 B2 9/2017 Lung et al.
9,902,589 B2 2/2018 Gregory et al.
9,986,855 B2 6/2018 Thrush
D822,453 S 7/2018 Kanter
10,051,978 B2 8/2018 Gupta et al.
10,088,097 B2 10/2018 Hermey
10,342,346 B2 7/2019 Hansen et al.
10,376,059 B1 8/2019 Ebersole et al.
10,492,631 B2 12/2019 Velderman et al.
10,500,713 B2 12/2019 Velderman et al.
10,568,422 B2 2/2020 Gibbons, Jr. et al.
10,568,442 B2 2/2020 Thrush
10,646,058 B2 5/2020 Jones
10,670,241 B2 6/2020 Ji
10,674,840 B2 6/2020 Haroush
D892,596 S 8/2020 Farnworth
D895,401 S 9/2020 Gupta
10,788,070 B2 9/2020 Forrest et al.
10,791,852 B2 10/2020 Jacobson et al.
10,827,853 B2 11/2020 Ma et al.
10,851,938 B2 12/2020 Glickstein et al.
10,925,412 B2 2/2021 Velderman et al.
10,968,935 B2 4/2021 Chen
11,079,061 B1 8/2021 Simon et al.
11,089,885 B2 8/2021 Keller
11,091,213 B2 8/2021 Flynn
11,096,310 B2 8/2021 Kutsche et al.
11,143,360 B2 10/2021 Brownstone
D948,077 S 4/2022 MacKarvich
D976,084 S 1/2023 Kosch
D976,085 S 1/2023 Kosch
11,787,664 B1 10/2023 Gebhardt
12,398,971 B1 8/2025 Holder
2002/0144962 A1 10/2002 Dettorre et al.
2003/0189020 A1 10/2003 Secondino
2003/0201376 A1 10/2003 Knight et al.
2004/0118986 A1 6/2004 Will et al.
2004/0149669 A1 8/2004 Tomonari et al.
2004/0222176 A1 11/2004 Campbell et al.
2005/0006539 A1 1/2005 Fischer et al.
2005/0055938 A1 3/2005 Secondino
2005/0121573 A1 6/2005 Ahlund et al.
2006/0180561 A1 8/2006 Wisnoski et al.
2007/0012636 A1 1/2007 Wisnoski et al.
2007/0012832 A1 1/2007 Ottens et al.
2007/0023374 A1 2/2007 Nawrocki
2007/0114348 A1 5/2007 Nawrocki
2007/0181517 A1 8/2007 Perkins et al.
2007/0251904 A1* 11/2007 Winig .................... A47B 96/06 211/106.01
2008/0000862 A1 1/2008 Lawson
2008/0047910 A1 2/2008 Kubota
2008/0105636 A1 5/2008 Lawson
2008/0105637 A1 5/2008 Lawson
2008/0169250 A1 7/2008 Nagelski
2008/0179474 A1 7/2008 Johnson
2009/0014401 A1 1/2009 Tallman
2009/0019787 A1 1/2009 Larson et al.
2009/0108160 A1 4/2009 Kluge et al.
2009/0229713 A1 9/2009 Ernst et al.
2009/0249727 A1 10/2009 Kosch
2010/0123063 A1 5/2010 Bauchet et al.
2010/0206825 A1* 8/2010 Johnston ............... A47F 5/0869 248/220.21
2010/0213333 A1 8/2010 Mejia et al.
2010/0213346 A1 8/2010 Chen
2010/0288891 A1 11/2010 Tisbo
2010/0308702 A1 12/2010 Apgood, II et al.
2011/0006181 A1 1/2011 Johnston et al.
2011/0049069 A1 3/2011 Kao
2011/0229256 A1 9/2011 Schwartzkopf et al.
2011/0315840 A1 12/2011 Connolly et al.
2012/0091086 A1 4/2012 Gregory et al.
2012/0104198 A1 5/2012 Phillips, Sr. et al.
2012/0187060 A1 7/2012 Candos
2012/0199708 A1 8/2012 Convey
2012/0298819 A1 11/2012 Begic et al.
2013/0037498 A1 2/2013 Kao
2013/0112637 A1 5/2013 Kuhn
2014/0048503 A1 2/2014 Gwag
2014/0061415 A1 3/2014 Hermey
2014/0145049 A1 5/2014 Magnusson et al.
2014/0217040 A1 8/2014 Wosoba et al.
2015/0214699 A1 7/2015 Lutze et al.
2015/0250334 A1 9/2015 Lung et al.
2016/0018054 A1 1/2016 Simon
2016/0059917 A1 3/2016 Hudson, Jr. et al.
2016/0206095 A1 7/2016 Hansen et al.
2017/0196378 A1 7/2017 Weshler et al.
2017/0198871 A1 7/2017 Keenan
2018/0231176 A1 8/2018 Sabounjian et al.
2019/0045946 A1 2/2019 Gupta et al.
2019/0290023 A1 9/2019 Ma et al.
2019/0309898 A1 10/2019 Krake et al.
2019/0368700 A1 12/2019 Ji
2020/0016446 A1 1/2020 Speckmaier
2020/0070334 A1 3/2020 Velderman et al.
2020/0077815 A1 3/2020 Jacobson et al.
2020/0232489 A1 7/2020 Vaughn et al.
2021/0022527 A1 1/2021 Keller
2024/0008670 A1 1/2024 Tan
2024/0337349 A1* 10/2024 Shatara ................. A47F 5/0846
2025/0204702 A1* 6/2025 Keenan ................. A47F 5/0853

FOREIGN PATENT DOCUMENTS

CA 2712330 C 1/2013
CA 2727294 C 7/2013
CA 3120290 A1 5/2020
CH 628227 A5 2/1982
CN 201341745 Y 11/2009
CN 202431671 U 9/2012
CN 108223509 B 4/2020
CN 111021653 B 4/2021
CN 110945728 B 7/2021
DE 3812773 A1 10/1989
DE 202020101706 U1 10/2020
DE 202020105254 U1 12/2020
EP 0362968 A1 4/1990
EP 1232705 A2 8/2002
EP 1476054 A1 11/2004
EP 2275008 A2 1/2011
EP 2249683 B1 8/2011
EP 2063747 B1 5/2013
EP 3427902 A1 1/2019
EP 3142519 B1 10/2019
EP 3288422 B1 2/2020
EP 3142831 B1 4/2020
EP 3639334 B1 10/2021
EP 3827932 B1 2/2022
EP 3554653 B1 3/2022
EP 3456484 B1 3/2023
GB 2020165 A 11/1979
GB 2129463 A 5/1984
GB 2325148 A 11/1998
RU 179128 U1 4/2018
RU 179346 U1 5/2018
RU 180548 U1 6/2018
RU 197024 U1 3/2020
WO 03070066 A1 8/2003
WO 2009007177 A1 1/2009
WO 2009048689 A1 4/2009
WO 2009073847 A1 6/2009
WO 2009100892 A1 8/2009
WO 2009114031 A1 9/2009
WO 2010132394 A1 11/2010
WO 2011044625 A1 4/2011
WO 2014047857 A1 4/2014

(56) References Cited

FOREIGN PATENT DOCUMENTS

| | | | |
|---|---|---|---|
| WO | 2015173217 | A1 | 11/2015 |
| WO | 2015173218 | A1 | 11/2015 |

OTHER PUBLICATIONS

Amazon, “Proslat 11004 ⅛-Inch Backplates Steel Hook Kit Designed for Proslat PVC Slatwall, 20 Piece, Silver”, https://www.amazon.ca/Proslat-11004-Backplates-Designed-Slatwall/dp/B009Q4D328/ref=sr_1_17?dchild=1&keywords=Slatwall%2BHooks&qid=1635191435&sr=8-17&th=1, 1996-2023, 8 pages.

English language abstract for CH 628227 A5 extracted from espacenet.com database on Jun. 22, 2023, 1 page.

English language abstract for CN 108223509 B extracted from espacenet.com database on Jun. 22, 2023, 1 page.

English language abstract for CN 110945728 B extracted from espacenet.com database on Jun. 22, 2023, 2 pages.

English language abstract for CN 111021653 B extracted from espacenet.com database on Jun. 22, 2023, 1 page.

English language abstract for CN 201341745 Y extracted from espacenet.com database on Jun. 22, 2023, 1 page.

English language abstract for CN 202431671 U extracted from espacenet.com database on Jun. 22, 2023, 1 page.

English language abstract for DE 38 127 73 A1 extracted from espacenet.com database on Jun. 22, 2023, 1 page.

English language abstract for EP 0 362 968 A1 extracted from espacenet.com database on Jun. 22, 2023, 2 pages.

English language abstract for EP 3 554 653 B1 extracted from espacenet.com database on Jun. 22, 2023, 1 page.

English language abstract for EP 3 639 334 B1 extracted from espacenet.com database on Jun. 22, 2023, 2 pages.

English language abstract for EP 3 827 932 B1 extracted from espacenet.com database on Jun. 22, 2023, 2 pages.

English language abstract for WO 2015173217 A1 extracted from espacenet.com database on Jun. 22, 2023, 1 page.

English language abstract for WO 2015173218 A1 extracted from espacenet.com database on Jun. 22, 2023, 2 pages.

Home Depot, “Garage Slat Wall Starter Kit (8-Piece)”, https://www.homedepot.com/p/Husky-Garage-Slat-Wall-Starter-Kit-8-Piece-80235HWSK/303712281, 2000-2022, 5 pages.

Home Depot, “Husky Vertical Bike Hook”, https://www.homedepot.ca/product/husky-vertical-bike-hook/1001004369, 2021, 4 pages.

Home Depot, “Rubbermaid FastTrack Garage Multi-Purpose Kit (15 Piece)”, https://www.homedepot.com/p/FAST-TRACK-FastTrack-Garage-Multi-Purpose-Kit-15-Piece-1928870/205644982, 200-2022, 4 pages.

Home Depot, “Slatwall Hook Kit (20 Piece)”, https://www.homedepot.com/p/Proslat-Slatwall-Hook-Kit-20-Piece-11004/203477238, 2000-2022, 6 pages.

Machine-assisted English language abstract for DE 20 2020 101 706 U1 extracted from espacenet.com database on Jun. 22, 2023, 2 pages.

Machine-assisted English language abstract for DE 20 2020 105 254 U1 extracted from espacenet.com database on Jun. 22, 2023, 2 pages.

Machine-assisted English language abstract for EP 3 142 519 B1 extracted from espacenet.com database on Jun. 22, 2023, 2 pages.

Machine-assisted English language abstract for EP 3 142 831 B1 extracted from espacenet.com database on Jun. 22, 2023, 3 pages.

Machine-assisted English language abstract for RU 179128 U1 extracted from espacenet.com database on Jun. 22, 2023, 2 pages.

Machine-assisted English language abstract for RU 179346 U1 extracted from espacenet.com database on Jun. 22, 2023, 2 pages.

Machine-assisted English language abstract for RU 180548 U1 extracted from espacenet.com database on Jun. 22, 2023, 2 pages.

Machine-assisted English language abstract for RU 197024 U1 extracted from espacenet.com database on Jun. 22, 2023, 2 pages.

Storewall, “Power Tool Hook”, https://www.storewall.ca/product/power-tool-hook/?v=707f3a40153b, 2021, 3 pages.

Design U.S. Appl. No. 29/889,038, filed Apr. 7, 2023.

New Age, “Lockable Slatwall 4 In. Double Hooks”, <https://shownewage.com/collections/slatwall-wall-organication/products/lockable-slatwall-4-in-double-hooks-pack-of-4-55526?variant=42958908883124&_gac=1.216867234.1764691881.EAlalQobChMIsfHBwaWfkQ,> 2025, 1page.

New Age, “Lockable Slatwall Vertical Bike Hook”, <https://shopnewage.com/collections/slatwal-wall-organization/products/lockable-slatwall-vertical-bike-hook-pack-of-2-55531?variant=42958975959220&_gac=1.216867234.1764691881.EAlalQobCHMI,> 2025, 1 page.

* cited by examiner 40
50
54
63
65
69A
62
58
66
52
56
69B
67
68
62A
68A
66A
64A
60
64
A2
70
72
72B
81
72A
78A
82
76A
80
74A
74
74B
76B
76
84
78B
78
A2
78B
140
154
152
150
154
90
99
110
92
100B
154
150
100
154
102
96
94

50
54
205B
209
205A
200
204B
204A
90
56
70

211
200
205B
205A
50
54
213
70
219
90
56
204B
204A 54
50
70
90
204B
204A
56
215
217
217
221
219
221
219

RELEASABLE MOUNTING MECHANISM FOR SLATWALL

FIELD OF THE DISCLOSURE

The subject disclosure relates to a mounting mechanism for use with a slatwall, and in particular to releasable mounting mechanisms for a slatwall.

BACKGROUND OF THE DISCLOSURE AND ADVANTAGES

Slatwalls are commonly used for storage and/or display of articles or accessories (collectively referred to as an accessory). Slatwall includes one or more, and typically a plurality of slatwall panels, coupled together with the panels defining a plurality of horizontally extending grooves (relative to a floor) that are vertically spaced apart and which are configured to accept and reversibly retain a variety of mounting mechanisms used to hold the articles and accessories.

The subject disclosure provides a mounting mechanism configured to support an accessory on a slatwall.

SUMMARY OF THE DISCLOSURE

In one aspect of the subject disclosure, a mounting mechanism configured to support an accessory on a slatwall, with the slatwall being a single panel defining a plurality of grooves or alternatively including a plurality of slatwall panels coupled together to define a plurality of spaced apart grooves, with each of the plurality of grooves defining a channel.

The mounting mechanism includes a mounting bracket having a body portion extending between first and second ends with the first end configured for receipt and retention within the channel of a first one of the plurality of grooves and the second end configured for receipt within a second one of the plurality of grooves, and with the body portion defining an opening. The mounting mechanism also includes a latch at least partially disposed within the opening and moveable between a retaining position and a release position, and a biasing member coupled to the latch for biasing the latch in the retaining position. The latch is configured to engage the channel of the second one of the plurality of grooves when the mounting bracket is disposed within the first one of the plurality of grooves and when the latch in the retaining position.

The subject disclosure also provides an associated system that includes the mounting mechanism and the slatwall as described above with the mounting mechanism configured to be reversibly mounted to the slatwall.

The subject disclosure also provides an associated method for reversibly mounting the mounting mechanism to the slatwall that includes the steps of disposing the first end of the mounting bracket within the channel of a first one of the plurality of grooves; pivoting the latch relative to the mounting bracket against the bias of at least one spring to move the latch from a retaining position to a release position; pivoting the mounting bracket such that a portion of the latch is disposed within the channel of a second one of the plurality of grooves while maintaining the first end of the mounting bracket within the channel of the first one of the plurality of grooves and while maintaining the latch in the release position; and automatically pivoting the latch relative to the mounting bracket to return the latch to the retaining position from the release position to engage the channel of the second one of the plurality of grooves while maintaining the first end of the mounting bracket within the first one of the plurality of grooves to secure the mounting bracket to the slatwall.

The subject disclosure this provides mounting mechanisms that are easy for a user to install, and subsequently uninstall, from a slatwall. Once installed, the mounting mechanisms and securely fastened to the slatwall for the subsequent acceptance of various articles for retention. Still further, the mounting mechanisms are easily repositionable on the slatwall as desired by simply uninstalling, moving, and reinstalling the mounting mechanism as desired. Still further, by providing such mounting mechanisms with accessories of different or varied sizes and shapes, articles of different sizes, shapes, and weights can be easily retained and stored by the user.

DETAILED DESCRIPTION OF THE PREFERRED EMBODIMENTS

Figure 1A:
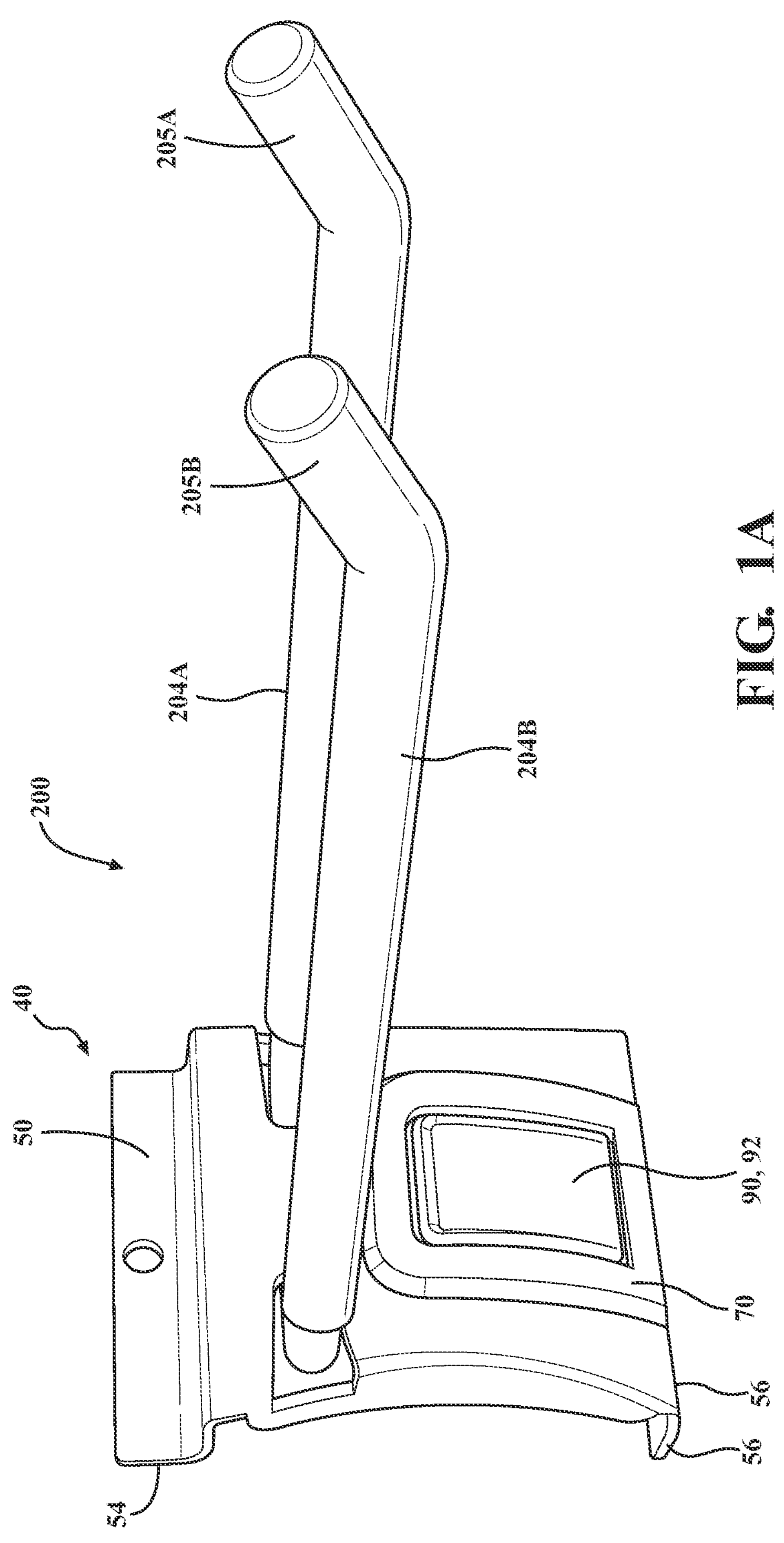
FIG. 1A is a front perspective view of a mounting mechanism including an accessory coupled to the mounting mechanism having a mounting bracket in accordance with an embodiment of the subject disclosure that illustrates a second end of the mounting bracket in accordance with one exemplary configuration.
Figure 1B:
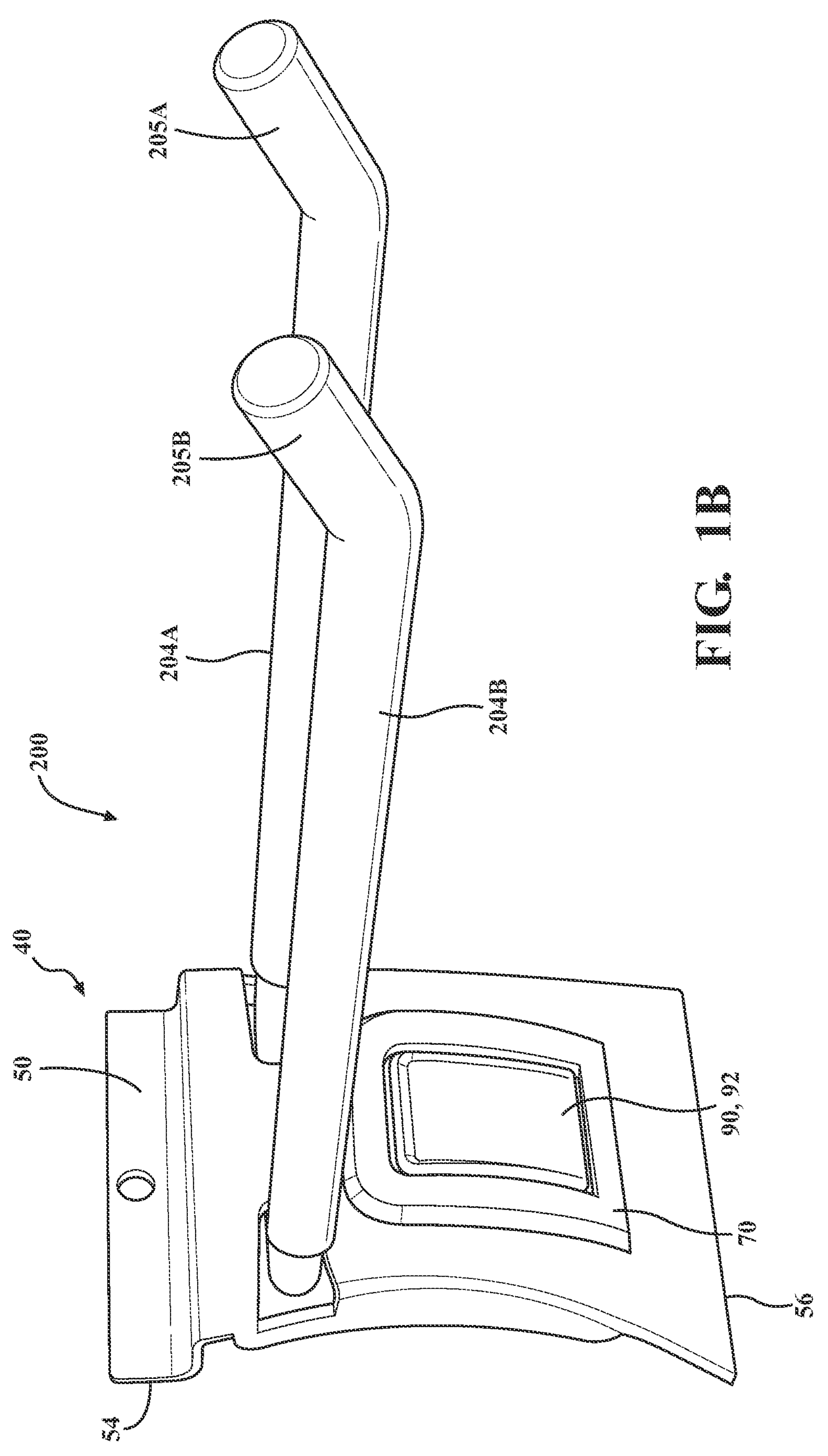
FIG. 1B is a front perspective view of a mounting mechanism including an accessory coupled to the mounting mechanism having a mounting bracket in accordance with an embodiment of the subject disclosure that illustrates a second end of the mounting bracket in accordance with another exemplary configuration.

With reference to the figures, the subject disclosure provides a mounting mechanism 40 generally in accordance with one of two exemplary embodiments as illustrated in FIGS. 1A and 1B configured for reversibly mounting to a slatwall 20.

Figure 2A:
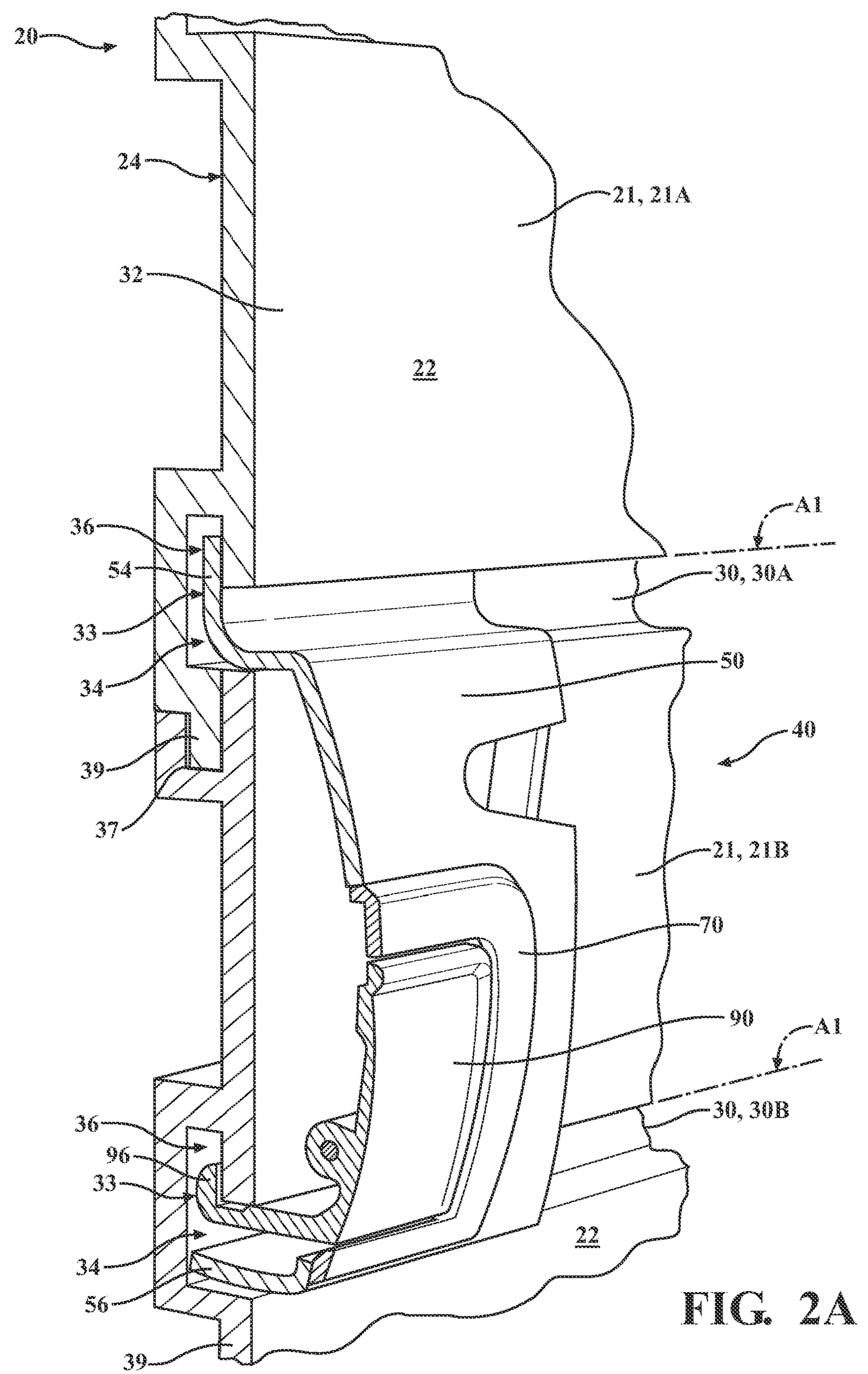
FIG. 2A is a front perspective view of a mounting mechanism of FIG. 1A in accordance with an embodiment of the subject disclosure mounted to a slatwall including a plurality of slatwall panels.
Figure 2B:
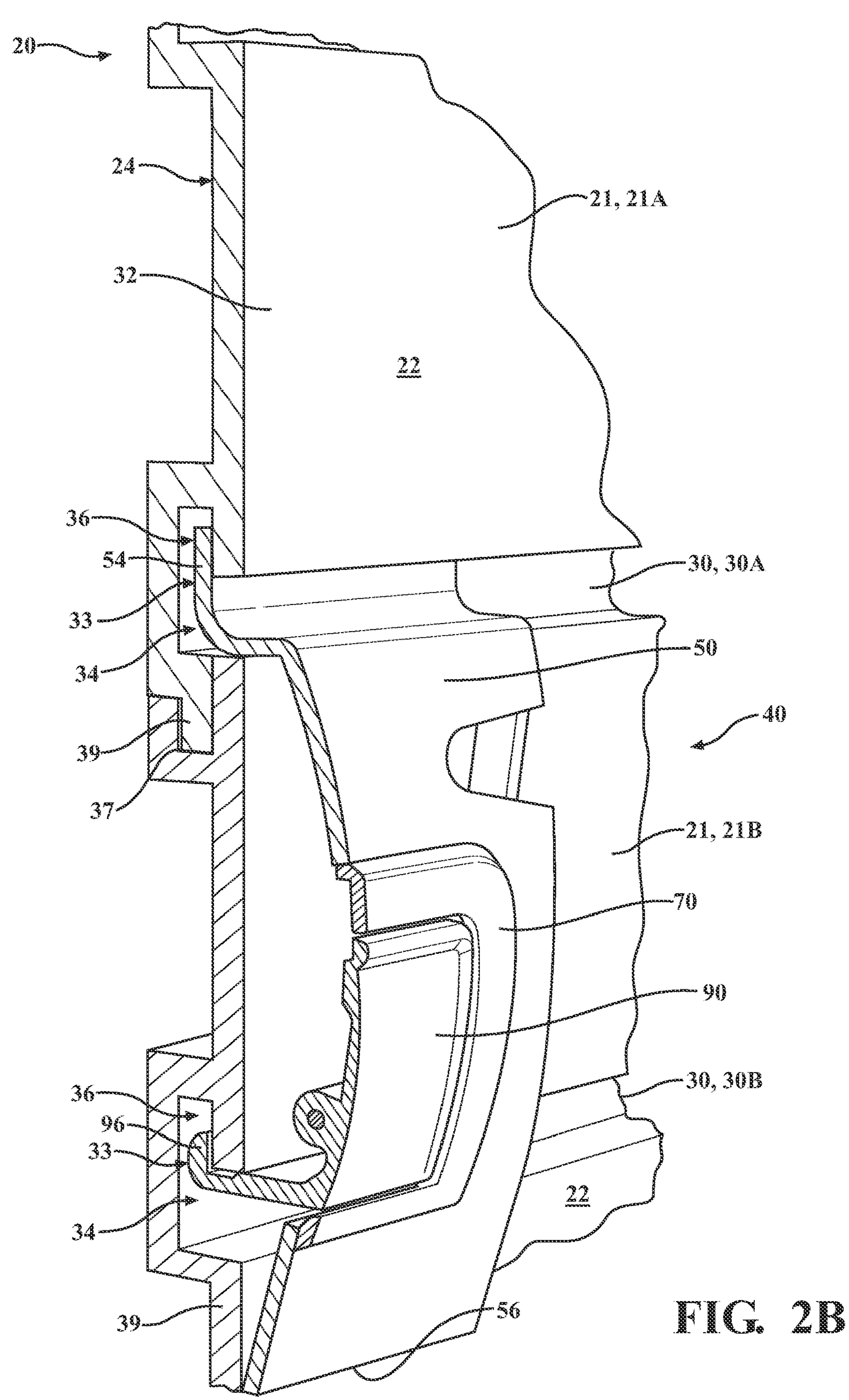
FIG. 2B is a front perspective view of a mounting mechanism of FIG. 1B in accordance with an alternative embodiment of the subject disclosure mounted to a slatwall including a plurality of slatwall panels.
Figure 5:
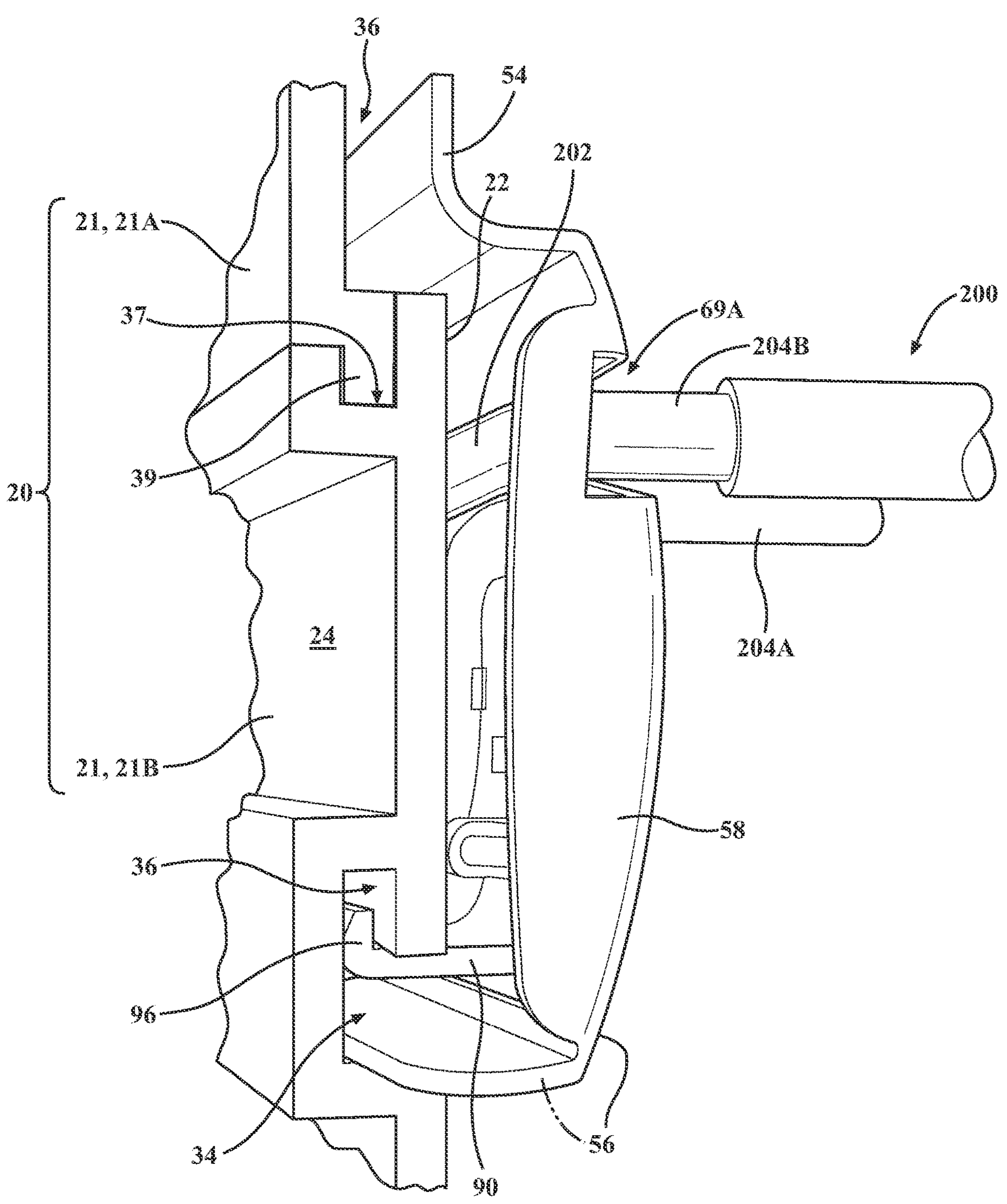
FIG. 5 is a side and section view of the mounting mechanism coupled to the slatwall as in FIG. 1A but also including the accessory of FIG. 1A and including multiple slatwall panels as in FIGS. 2A and 2B.

The slatwall 20, as best shown in FIGS. 2A and 2B and 5 in one exemplary embodiment, includes a plurality of slatwall panels 21 that are collectively reversibly mounted together to form the slatwall 20 that is itself coupled to or otherwise mounted to a wall (not shown). In an alternative embodiment, as shown in FIG. 2C, a single slatwall panel is utilized (i.e., there are no slatwall panels 21 that are collectively reversibly mounted together to form the slatwall 20).

Figure 2C:
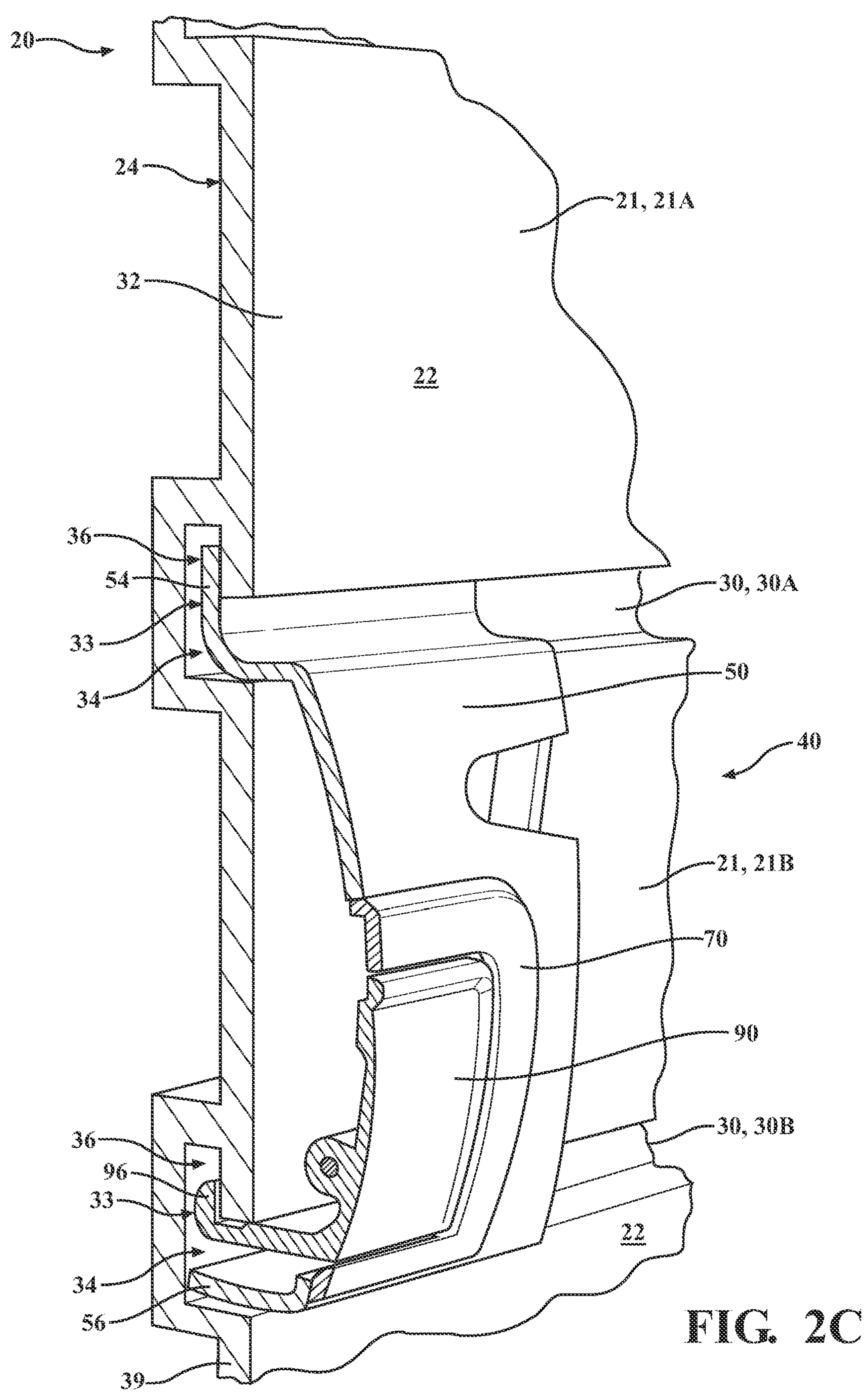
FIG. 2C is a front perspective view of a mounting mechanism of FIG. 1A and FIG. 2A mounted a slatwall including a single slatwall panel in accordance with an alternative slatwall embodiment.

As used hereinafter, components or features the slatwall 20 may result after the reversible mounting of multiple slatwall panels 21 together to form the slatwall 20 in a preassembled state, as shown in FIG. 2A or 2B or 5, or may be described as it relates to a single slatwall panel 20, as shown in FIG. 2C. The slatwall 20 formed as a single panel in FIG. 2C or by slatwall panels 21 in FIGS. 2A and 2B or 5 are conventional in nature and do not form part of the inventive concept of the subject disclosure, other than when used in a system in combination with the mounting mechanism 40 of the various embodiments described herein. For ease of description below, in certain instances, features that result by the reversible mounting of adjacent slatwall panels 21A, 21B in FIGS. 2A and 2B or 5 to one another to form the slatwall 20 which are the same as the features described in the single slatwall 20 of FIG. 2C which are common are identified by the same reference numerals hereinafter and in the representative Figures.

The slatwall 20 in each of FIGS. 2A-2C and 5 are defined between a front facing surface 22 and an opposing rear facing surface 24. A plurality of spaced apart grooves 30 are provided which extend within the front facing surface 22 that result from the reversible mounting of adjacent slatwall panels 21A, 21B (as shown in FIG. 2B) to one another with the resultant slatwall 20 configured to reversibly mount the respective mounting mechanisms 40 to the slatwall 20.

In each of the embodiments of FIGS. 2A-2C and 5, the plurality of grooves 30 can be further defined as including a first one 30A of the plurality of grooves and a second one 30B of the plurality of grooves 30. In certain of these embodiments, including the embodiments of each of FIGS. 2A-2C and 5, the first one 30A and second one 30B of the grooves are adjacent to one another and extend in an alternating fashion with respect to one another. In certain other embodiments, at least one groove 30 may be positioned between the first one 30A and the second one 30B of the grooves 30.

Preferably, the grooves 30, 30A, 30B extend in length parallel to one another along the front facing surface 22 and, in certain embodiments, the slatwall 20 is positioned such that each of the parallel grooves 30 extend generally horizontally with respect to a floor (not shown) where the slatwall 20 is installed extending in a direction away from the floor (upwardly as shown in FIGS. 2A-2C and 5). As defined herein, the term "generally horizontally" refers to an axis A1 (see FIG. 2A) defined along the length of the respective grooves 30 that is parallel to an axis defined by the upper surface of the underlying floor (not shown) but may vary slightly by up to about 5 degrees such that each of the grooves 30 define an angle between the axis of the floor and axis A1 of the grooves 30. Still further, it is preferable that the distance between any two adjacent grooves 30, 30A, 30B in a direction normal to the length of the grooves 30, 30A, 30B is uniform (i.e., equally spaced), although in further embodiments the distance between and two or more adjacent grooves 30, 30A, 30B may be varied.

Still further, while the grooves 30, 30A, 30B of FIGS. 2A-2C and 5 are illustrated as having the same widths (vertical widths as shown in FIGS. 2A-2C and 5), it is contemplated that any one or more of the grooves 30, 30A, 30B may have a different width relative to another one or more of the grooves 30, 30A, 30B.

In the embodiments of FIGS. 2A and 2B and 5, a first one 30A of the plurality of grooves are partially defined by an adjacent pair 21A, 21A of the slatwall panels 21, while a second one 30B of the plurality of grooves 30 are defined by a single slatwall panel 21A or 21B, with the first one 30A of the plurality of grooves 30 and the second one 30B of the plurality of grooves 30 alternating with respect to one another along the set of coupled slatwall panels 21. In addition, a portion of the respective slatwall panels 21A, 21B located between the adjacent pair 30A, 30B of the grooves 30 may be defined further as a panel 32.

While FIGS. 2A and 2B and 5 illustrate a slatwall 20 that includes a pair of slatwall panels 21A, 21B, of a defined length (the length in the vertical direction as illustrated in FIGS. 2A and 2B and 5—i.e., the vertical length) it is understood that the overall length of the slatwall 20 of FIGS. 2A and 2B and 5 can be increased by adding additional slatwall panels 21A or 21B above or below the illustrated slatwall panels 21A, 21B. In addition, slatwall panels 21A, 21B of varying vertical lengths (not shown) may also be included in forming a slatwall 20 having increased overall length as compared to the slatwall 20 illustrated in FIGS. 2A and 2B and 5, with the additional varying length slatwall panels 21A or 21B being included below or between the illustrated slatwall panels 21A, 21B.

Each groove 30, 30A, 30B in the embodiments of FIGS. 2A-2C and 5 defines a channel 33 therein. The channel 33 may be further defined as including an open channel portion 34, an upper channel portion 36 extending from the open channel portion 34 in one direction (upward as shown in FIGS. 2A-C and 5), and an optional lower channel portion 37 extending from the open channel portion 34 in a direction opposite the upper channel portion 36 (as shown in the embodiment of FIG. 2C). The upper channel portion 36 that is positioned between the panel 32 and the rearward surface 24 and is located at the bottom of a respective panel 21A or 21B, with the open channel portion 34 being in communication with the upper channel portion 36. By contrast, the panel 32 does not cover the open channel portion 34, which is open in a direction away from the rearward surface 24. The optional lower channel portion 37 which is present in the embodiment of FIGS. 2A and 2B and 5, which is also defined at the top of each respective slatwall panel 21A, 21B, is configured to receive a stepped flange portion 39 of a bottom of a respective adjacent slatwall panel 21A, 21B (if present) when reversibly mounting adjacent slatwall panels 21A, 21B to one another to form the slatwall 20. In particular, as shown in FIGS. 2A and 2B and 5, the stepped flange portion 39, when present, of the first slatwall panel 21A is received within the lower channel portion 37.

In alternative embodiments of the slatwall 20, as shown in FIG. 2C, a single panel 20 replaces the plurality of panels 21, 21A, 21B. In this embodiment, there is no need for the lower channel portion 37 or the stepped panel 39 that extends within the lower channel portion 37 to retain the upper slatwall panel 21A onto the lower adjacent slatwall panel 21B as in FIGS. 2A and 2B.

In the various configurations of the embodiments of the subject disclosure, as will be described in further detail below, the mounting mechanism 40 is configured to be received and retained within the channels 33 of a respective pair 30A, 30B of the grooves 30, hereinafter designated as a first one 30A and a second one 30B of the grooves 30, contained within and defined by the single slatwall panel 20 as in FIG. 2C or a respective pair of the slatwall panels 21, 21A, 21B as in FIGS. 2A, 2B and 5.

In certain embodiments, as shown in FIGS. 2A-2C and 5, the first one 30A and the second one 30B of the grooves 30 define an adjacent pair of grooves 30, in which there is a single panel 32 of one of and adjacent pair of slatwalls 21A or 21B disposed between the first the first one 30A and the second one 30B of the grooves 30. Alternatively, in other embodiments (not shown), one or more grooves 30 may be disposed between the first one 30A and the second one 30B of the grooves 30 (i.e., the first one 30A and second one 30B of the grooves 30 are not an adjacent pair of grooves 30, but are grooves 30 defined by slatwall panels 21 that are not adjacent pairs of slatwall panels 21A and 21B).

Figure 4:
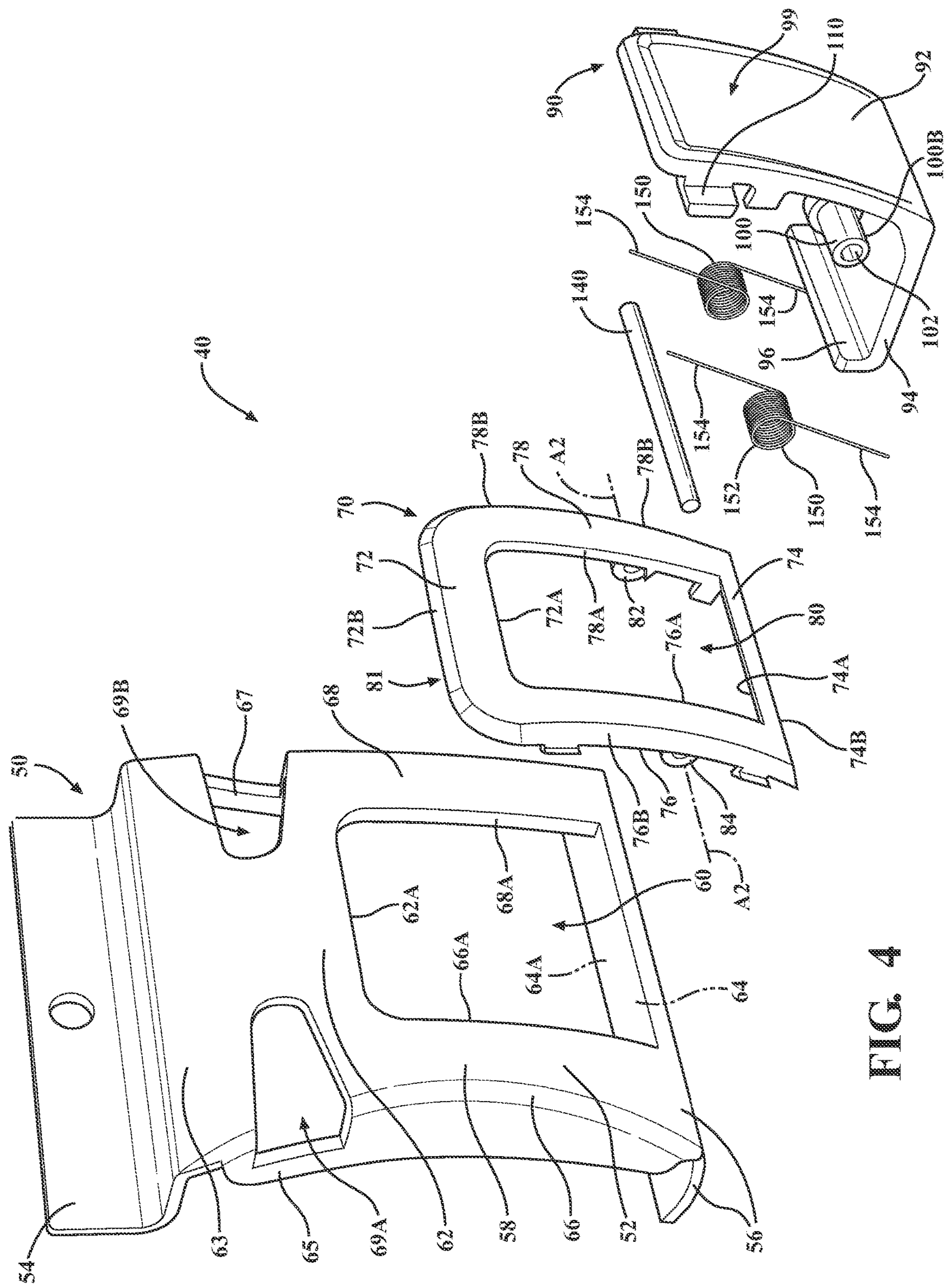
FIG. 4 is an exploded view of the mounting mechanism of FIG. 1A without the accessory.

As best shown in FIGS. 1A, 1B and 4, the mounting mechanism 40, in accordance with each of the exemplary embodiments (the exemplary embodiment of FIG. 4 corresponds to FIG. 1A and represents each of the features of FIG. 1B with the exception to the configuration of the second end 56 described further below) includes a mounting bracket 50, a bezel 70, and a latch 90. The latch 90 is a type of mechanical fastener that joins two (or more) objects or surfaces while allowing for their regular separation, and typically engages another piece of hardware on a mounting surface. As will be explained in further detail below, the latch 90, in accordance with the embodiments of the subject application, is at least partially disposed within an opening (i.e., the central opening 60 as shown in FIG. 4) and is pivotally coupled to the mounting bracket 50 through the bezel 70 (i.e., the latch 90 pivots relative to the bezel 70 when in an assembled state), preferably through the use of a pivot pin 140. In addition, the latch 90 is configured to be pivotally moveable between a retaining position and a release position, preferably through the use of one or more biasing members 150 such as springs 150, as will also be explained in further detail below. While the subject application illustrates and describes certain embodiments of the latch 90, the subject application contemplates latches having various modifications to those described and illustrated that function in substantially the same manner to reversibly couple or otherwise reversibly join the mounting mechanism 40 to the slatwall 20.

The mounting bracket 50 includes a body portion 52 extending between a first end 54 and a second end 56. In each of the embodiments, the first end 54 is configured for receipt and retention within the upper channel portion 36 of a first one (shown as 30A in FIGS. 2A-C and 5) of the grooves 30 of the slatwall 20. In certain embodiments, such as shown in FIGS. 1A, 2A, 2C, 5 and 6A-6F, the second end 56 is configured for receipt within a second one (shown as 30B in FIGS. 2A and 2B) of the grooves 30, and in particular within the open channel portion 34 of the second one 30B of the grooves 30 of the slatwall 20. Alternatively, as shown in FIGS. 1B and 2B, the second end 56 extends in length and is positioned adjacent to outer surface 22 of the slatwall 20 in proximity to and beneath the second one 30B of the grooves 30 and does not extend within the open channel portion 34 of the second one 30B of the grooves 30.

Accordingly, the description of the majority of the features of the mounting bracket 50 in the paragraphs below, other than the description and illustrations of the second end 56 in specific instances described below, is consistent between the embodiments of FIGS. 1A and 1B.

As best shown in FIG. 4, the mounting bracket 50 also includes a central region 58 extending between the first end 54 and the second end 56 with the central region 58 defining a central opening 60. In particular, the body portion 52 of the mounting bracket 52 defines a central region 58 that includes an upper beam 62, an opposing lower beam 64, and a pair of spaced apart sidewalls 66, 68 each separately connecting the upper beam 62 to the lower beam 64, with a respective inner surface 62A, 64A, 66A, and 68A of the beams 62, 64 and sidewalls 66, 68 collectively defining the central opening 60. Preferably, and as illustrated best in FIG. 4, the distance between the respective inner surface 62A and 64A, and between the respective inner surfaces 66A, and 68A, are the same such that the central opening defines a rectangular-shaped central opening 66. Still further, and as also illustrated in FIG. 4, the central opening 66 is preferably centered on the mounting bracket 50 in the horizontal direction between the outer surface of the upper and lower beams 62, 64, and also in the vertical direction between the spaced apart sidewalls 66, 68.

The body portion 52 also includes an uppermost beam 63 extending from the upper beam 62 and the pair of sidewalls extensions 65, 67 extending from a respective sidewall 66, 68 that connects to the uppermost beam 63. The uppermost beam 63 and the sidewall extensions 65, 67 and upper beam 62 define a pair of retainment feature openings 69A, 69B.

In the embodiments illustrated, an axis line (or axis plane) defined by the outer surface of the sidewall extensions 65, 67 are parallel to one another such that the lengths of the respective upper beam 62 and lower beam 64 are the same. However, in alternative embodiments (not shown), the axis line defined by the outer surface of the sidewall extensions 65, 67 are not parallel, resulting in the lengths of the upper beam 62 and lower beam 64 being different (such as the length of the upper beam 62 being longer than the length of the lower beam 64, or vice versa).

Preferably, the mounting bracket 50 is formed from a hard, durable material such as a metal or metal alloy. More preferably, the mounting bracket 50 is formed from steel.

As also shown in FIG. 4, the mounting mechanism 40 also includes the bezel 70, sometimes referred to alternatively as a retention member 70, that is retained within the central opening 60 of the mounting bracket 50 (as best shown in FIGS. 1-3 and 5). The bezel 70 defines a bezel opening 80 that is aligned with the central opening 60 of the mounting bracket 50 when the bezel 70 is retained to the mounting bracket 50.

The bezel 70 includes an upper beam 72, an opposing lower beam 74, and a pair of spaced apart sidewalls 76, 78 each separately connecting the upper beam 72 to the lower beam 74, with a respective inner surface 72A, 74A, 76A, and 78A of the beams 72, 74 and sidewalls 76, 78 collectively defining the bezel opening 80. In addition, a respective outer surface 72B, 74B, 76B, and 78B of the beams 72, 74 and sidewalls 76, 78 of the bezel 70 are sized, shaped and otherwise configured to be retained adjacent to the respective inner surface 62A, 64A, 66A, and 68A of the beams 62, 64 and sidewalls 66, 68 when the bezel 70 is mounted to and retained to the mounting bracket 50.

Figure 3:
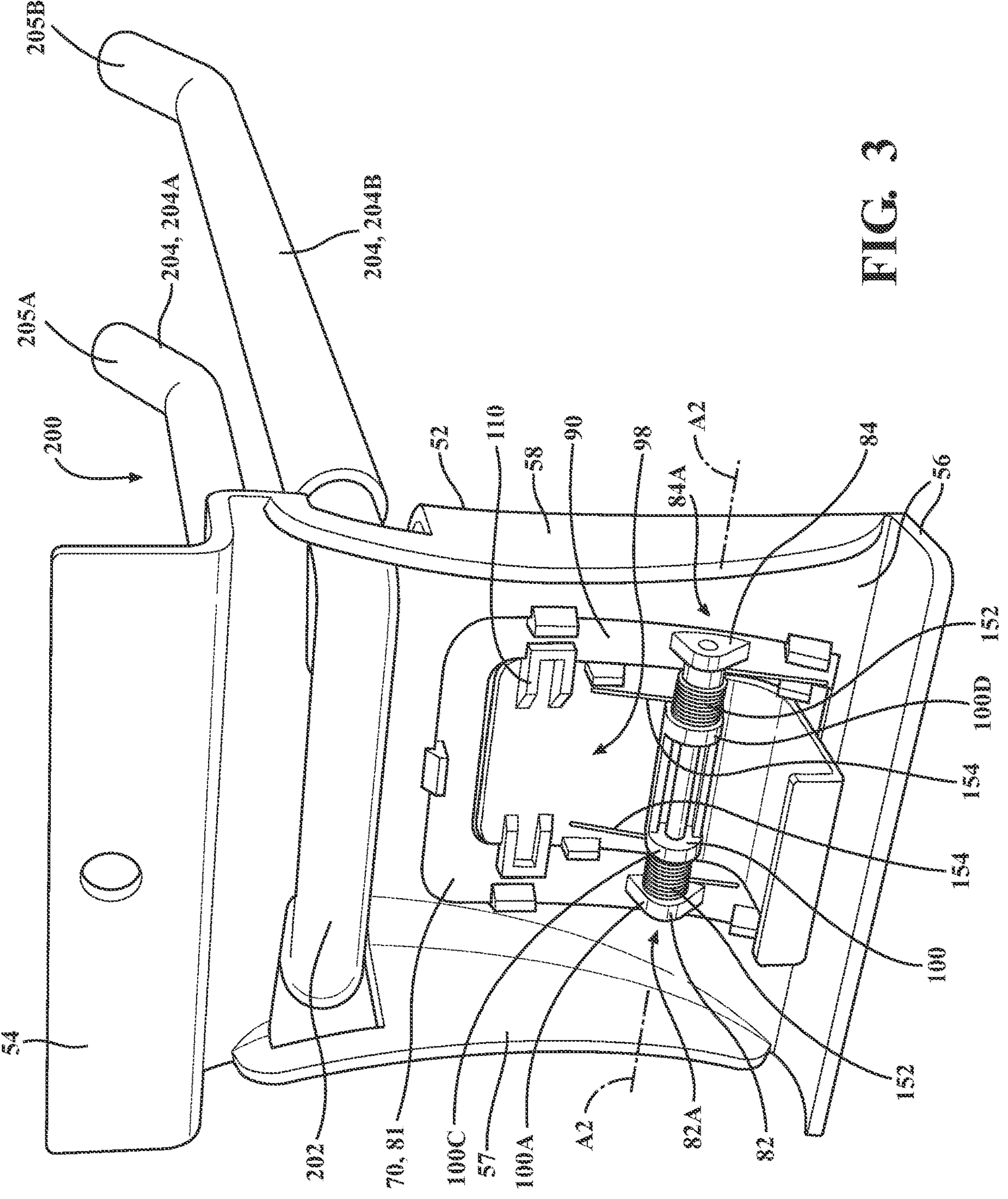
FIG. 3 is a rear perspective view of the FIG. 1A.

As best shown in FIG. 3, a rearward side 81 of the bezel 70 along each of the respective sidewalls 76, 78 includes cylinder portions 82, 84 each defining a respective opening 82A, 84A, with the openings 82A, 84A aligned along an axis A2.

In certain embodiments, the bezel 70 is made from a hard, durable plastic such as ABS (acrylonitrile-butadiene-styrene).

As also shown in FIGS. 3 and 4, the mounting mechanism 40 also includes a latch 90 pivotally coupled to the bezel 70 (and hence pivotally coupled to the mounting bracket 50 through the bezel 70) and at least partially disposed within the central opening 60 and the bezel opening 80, with the latch 90 pivotally moveable between a retaining position and a release position. The latch 90 is configured to be retained within the upper channel portion 36 of the second one 30B of the plurality of grooves 30 when the first end 54 of the mounting bracket 50 is disposed within the first one 30A of the plurality of grooves 30, and when the second end 56 of the mounting bracket 50 is disposed within the second one 30B of the plurality of grooves 30 as in FIGS. 2A and 2C or when the second end 56 is positioned in proximity to the second one 30B of the grooves 30 as in FIG. 2B, and when the latch 90 is in the retaining position, as will be described further below.

The latch 90 includes a base portion 92 and a flange portion 94 extending from the base portion 92 with the flange portion 94 including a lip 96 extending from the flange portion 94. Preferably, the lip 96 extends in a transverse direction relative to the flange portion 94 and may hereinafter be referred to alternatively as a transverse lip 96.

As shown in FIGS. 2A-2C and 5, the transverse lip 96 is configured to be disposed and retained within the upper channel portion 36 of the second one 30B of the plurality of grooves 30 when the first end 54 of the mounting bracket 50 is within the upper channel portion 36 of the first one 30A of the plurality of grooves 30 and when the latch 90 is in the retaining position.

The transverse lip 96, in certain embodiments is also configured to not be disposed and retained within the upper channel portion 36 of the second one 30B of the plurality of grooves 30 when the first end 54 of the mounting bracket 50 is within the upper channel portion 36 of the first one 30A of the plurality of grooves 30 and when the latch 90 is in the release position.

As best shown in FIGS. 3 and 4, an inward side 98 of the latch 90 includes a cylindrical body portion 100 including an inner opening 102 with a length of the inner opening 102 of the cylindrical body portion 100 aligned along an axis A2 when the latch 90 is pivotally coupled to the bezel 70 (i.e., the inner opening 102 of the cylindrical body portion 100 of the bezel 70 is aligned with the openings 82A, 84A of the cylinder portions 82, 84 of each of the sidewall portions 76, 78 when the latch 90 is pivotally coupled to the bezel 70).

As best shown in FIG. 5, the inward side 98 of the latch 90 also includes a stop 110 spaced from the cylindrical body portion 100 in a direction away from the transverse lip 96. In particular, the stop 110 is positioned adjacent to and typically in engaging contact with the bezel 70 and between the slatwall 20 and the bezel 70 in the retaining position with the stop 110 spaced from the bezel 70 in a direction towards the slatwall 20 and between the slatwall 20 and the bezel 70 in the release position. In this regard, the stop 110 engages the bezel 70 to prevent further rotation of the latch 90 when the latch 90 is automatically pivoted from the release position to the retaining position when the user removes force from the latch 90.

As best shown in FIG. 4, the mounting mechanism 40 also includes a pivot pin 140 disposed within the openings 82A, 84A of each of the cylinder portions 82, 84 and within the cylindrical inner opening 102 of the latch 90 for pivotally coupling the latch 90 to the bezel 70 (and hence pivotally coupling the latch 90 to the mounting bracket 50 through the bezel 70).

As best shown in FIG. 3, the mounting mechanism 40 also includes at least one biasing member 150 coupled to the latch 90 for biasing the latch 90 in the retaining position. More specifically, each of the biasing members 150 are retained to the cylindrical body portion 100 of the latch 90.

In one exemplary embodiment, as best illustrated in FIGS. 3 and 4, the biasing members 150 are in the form of a pair of springs 150, and in particular torsion springs 150. The torsion springs 150, in certain embodiments such as shown in FIGS. 3 and 4, are formed from a metal rod or wire and include a coiled portion 152 and a bar portion 154 extending from the coiled portion 152, or a pair of bar portions 154 extending from the coiled portion 152 (collectively referred to as bar portion 154 hereinafter). The coiled portion 152 is preferably helically wrapped in which the wire within each coil is adjacent to the wire within the next coil and wherein the coils of wire are not wrapped onto each other. The coils 152 are retained around a respective cylindrical outer surface 100C, 100D of each end 100A, 100B of the cylindrical body portion 100, while the bar portion 154 at one end of the spring 150 is positioned in abutting contact with the inward side 98 of the latch 90 between the stop 110 and the cylindrical body portion 100.

The resistive force of the bar portion 154 of each respective spring 150 is configured to retain the latch 90 in the retaining position when the mounting mechanism 40 is reversibly mounted to the slatwall 20 with the first and second ends of the mounting bracket 50 disposed in a respective one of the grooves 30 of the slatwall 20. In particular, the resistive force of the bar portion 154 of each respective spring 150 pivots the latch 90 such that the stop 110 is brought into engaging contact with bezel 70 (i.e., adjacent to and into engaging contact with the bezel 70) in the retaining position. Conversely, when force is applied to the outward side 99 of the latch 90 to move the proximate flange end 94 in a direction away from the slatwall 20, the latch 90 also pivots about axis A2 in a first pivoting direction such that the stop 110 is moved out of engaging contact with the bezel 70 and into the release position (i.e., where the stop 110 is out of engaging contact with the bezel 70 and moved in a direction towards the slatwall 20 and with the transverse lip 96 not contained within the upper channel portion 36). Once the force is removed from the outward side 99 of the latch 90, the resistive force of the bar portion 154 automatically pivots the latch 90 in a second pivoting direction about axis A2 opposite the first pivoting direction and returns the stop 110 into engaging contact with the bezel 70 and back into the retaining position, with the engaging contact between the stop 110 and the bezel 70 preventing further rotation of the latch 90 against the force of the spring 150.

The mounting mechanism 40 also includes an accessory 200 coupled to the body portion 52 of the mounting bracket 50. The accessory 200 extends outwardly away from both the slatwall 20 and the mounting mechanism 40 and is configured to provide a user with a feature or features for holding objects.

The accessory 200 includes a retaining feature 202 and at least one hooking feature 204 extending from the retaining feature 202. The retaining feature 202 is positioned between the body portion 52 and the slatwall 20 when the mounting mechanism 40 including the accessory 200 is mounted to the slatwall 20.

Figure 6A:
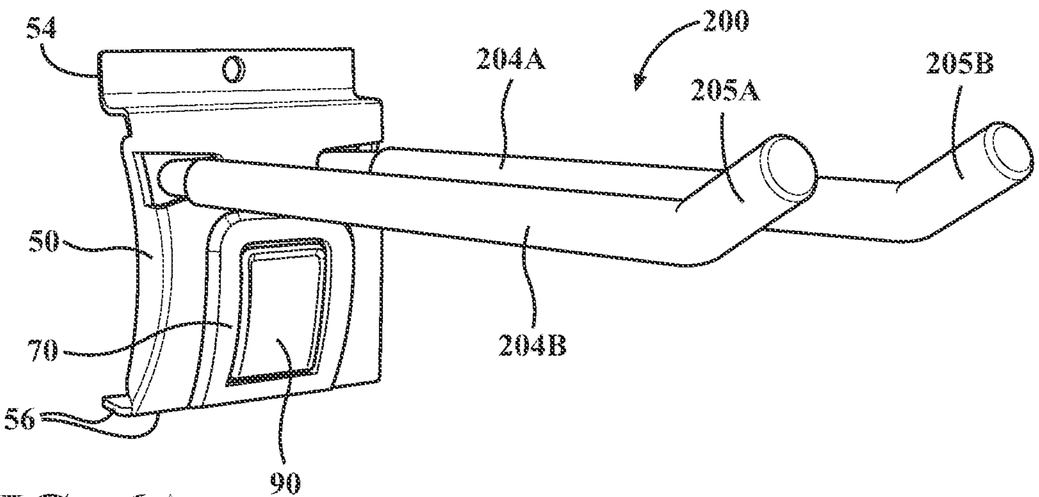
FIG. 6A is another perspective view of the mounting mechanism including the accessory in accordance with the embodiment of FIG. 1A.
Figure 6B:
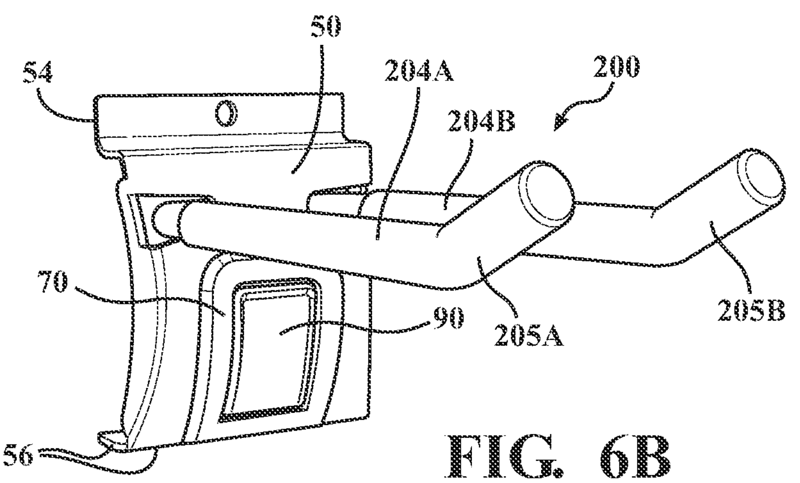
FIG. 6B is another perspective view of the mounting mechanism of FIG. 1A including an accessory in accordance with another exemplary embodiment.

In particular, in certain embodiments such as shown in FIGS. 2, 3, 5, 6A, 6B, and 6F, the accessory 200 is in the form of a u-shaped member with a pair of hooking features 204A, 204B extending transverse from each respective end of the retaining feature 202. The length of the pair of hooking features 204A, 204B extending respectively outwardly from the retaining feature 202 may vary, as shown in comparing FIGS. 6A and 6B (with the length of the hooking features 204A, 204B in FIG. 6B illustrated as being approximately half as long as the length of the hooking features 204A, 204B in FIG. 6A. While not illustrated, in still further embodiments, the length of one of the hooking features 204A (or 204B) may be longer than the length of the other one of the hooking features 204B (or 204A).

As also illustrated in each of FIGS. 3, 6A and 6B, the ends 205A, 205B of each respective hooking feature 204A, 204B extend transverse to the length of the hooking feature 204A, 204B, and preferably transversely and upwardly (as shown in Figures) relative to the length of the remaining portion of the hooking feature 204A, 204B extending towards the retaining feature 202) when the mounting mechanism 40 is reversibly mounted to the slatwall 20). This allows for items being placed onto one or both of the hooking features for storage to more easily be retained without sliding off the ends 205A, 205B of the hooking features 204A, 204B due to gravity.

In still further embodiments, the subject disclosure also provides wherein the accessory 200 may in in the form of a wide variety of other shapes and sizes. A non-exhaustive list of further embodiments in illustrated in FIGS. 6C-6F.

Figure 6C:
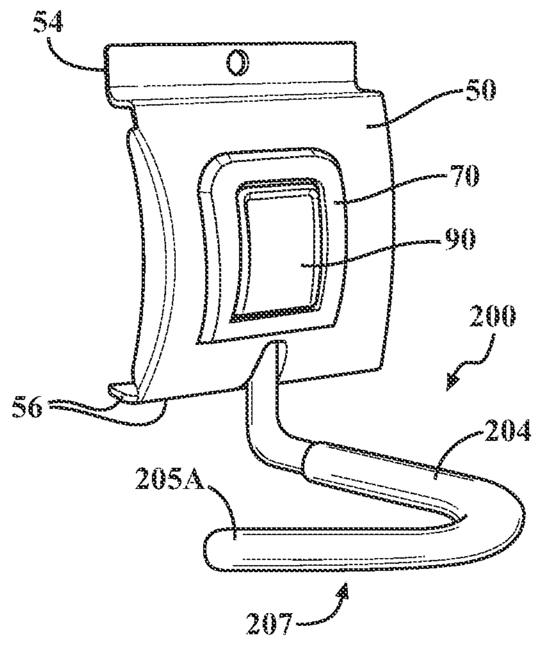
FIG. 6C is another perspective view of the mounting mechanism similar to the mounting mechanism of FIG. 1A but wherein the mounting bracket has a different opening patter to retain and receive an accessory in accordance with yet another exemplary embodiment.

For example, in FIG. 6C, a single hooking feature 204 are curved in a u-shape with the ends 205A extending back towards the retaining feature 202 to form a curved loop 207. This configuration is suitable for use as vertical bike hook to accept the tire of a bike for storage. The single hooking feature 204 is retained within an opening at the bottom of the mounting bracket 50 as opposed to the hooking features of the embodiments of FIGS. 1A, 1B, 6A, 6B, and 6D-6F being retained through the openings 69A, 69B of the mounting bracket 50.

Figures 6D, 6E, 6F:
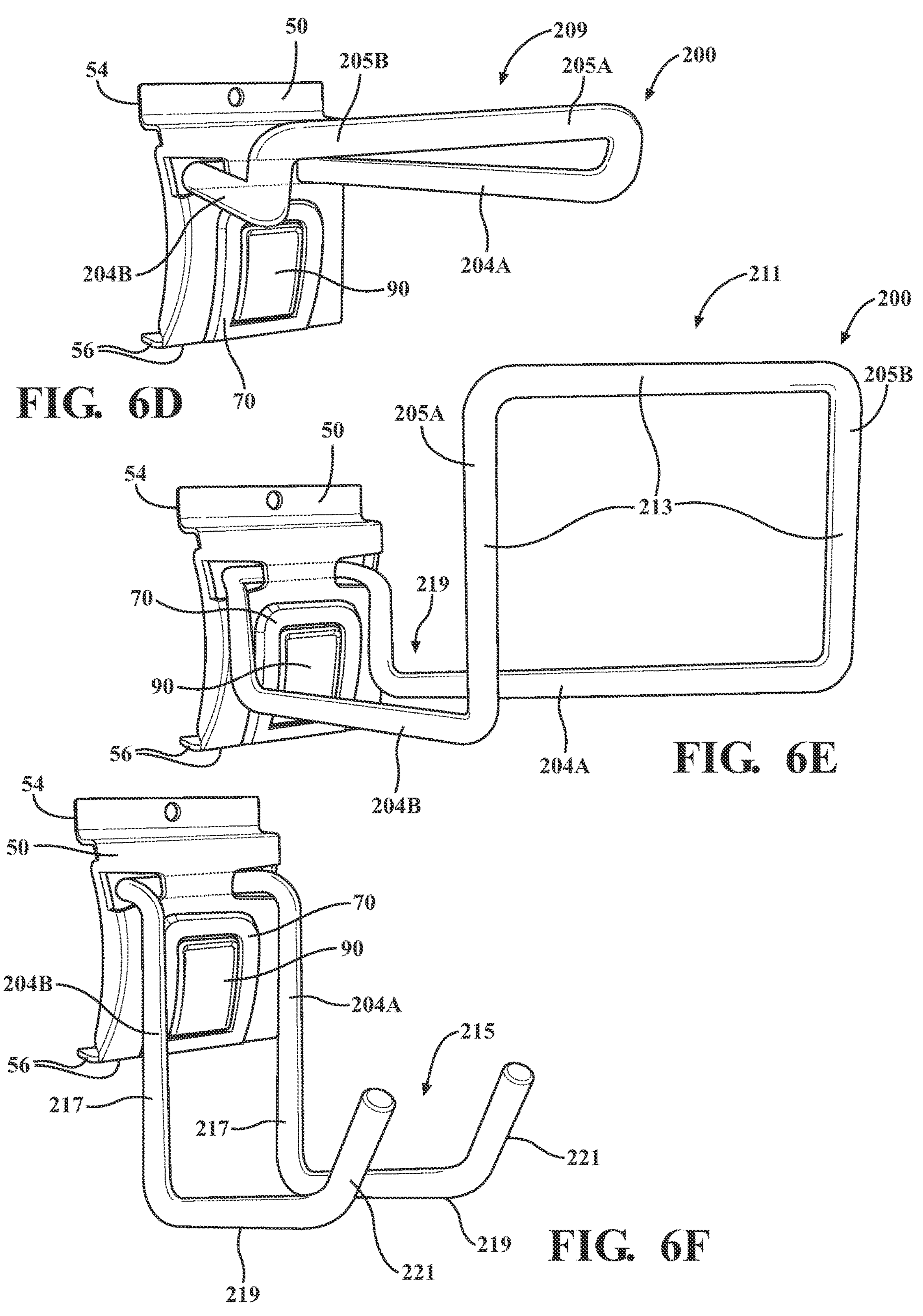
FIG. 6D is another perspective view of the mounting mechanism of FIG. 1A including an accessory in accordance with still another exemplary embodiment.
FIG. 6E is another perspective view of the mounting mechanism of FIG. 1A including an accessory in accordance with yet still another exemplary embodiment.
FIG. 6F is another perspective view of the mounting mechanism of FIG. 1A including an accessory in accordance with even still another exemplary embodiment.

In another example, as shown in FIG. 6D, the ends 205A, 205B of each respective hooking feature 204A, 204B are coupled together to form a continuous loop 209.

In a still further example, as shown in FIG. 6E, the ends 205A, 205B of each respective hooking feature 204A, 204B are coupled together to form a continuous partially rectangular shaped loop 211, with the rectangular loop sides 213 extending transverse to the length of the remainder of the hooking features 204A, 204B which form a trough 219 such that the accessory 200 may be considered a deep utility hook.

In yet another example, as shown in FIG. 6F, the accessory 200 is in the form of a J-hook 215, in which the hooking features 204A, 204B extend downwardly (i.e., a downward portion 217), then outwardly horizontally (i.e., a horizontal portion 219), and then transversely upwardly (i.e., an upward portion 221) from the retaining feature 202 relative to the ground (i.e., downwardly, outwardly horizontally, and then transversely upwardly as shown in FIG. 6F) when the mounting mechanism 40 is reversibly mounted to the slatwall 20.

The subject disclosure also provides an associated method 300 for reversibly mounting the mounting mechanism 40 to the slatwall 20 as illustrated in FIGS. 1 and 5.

Figure 7:
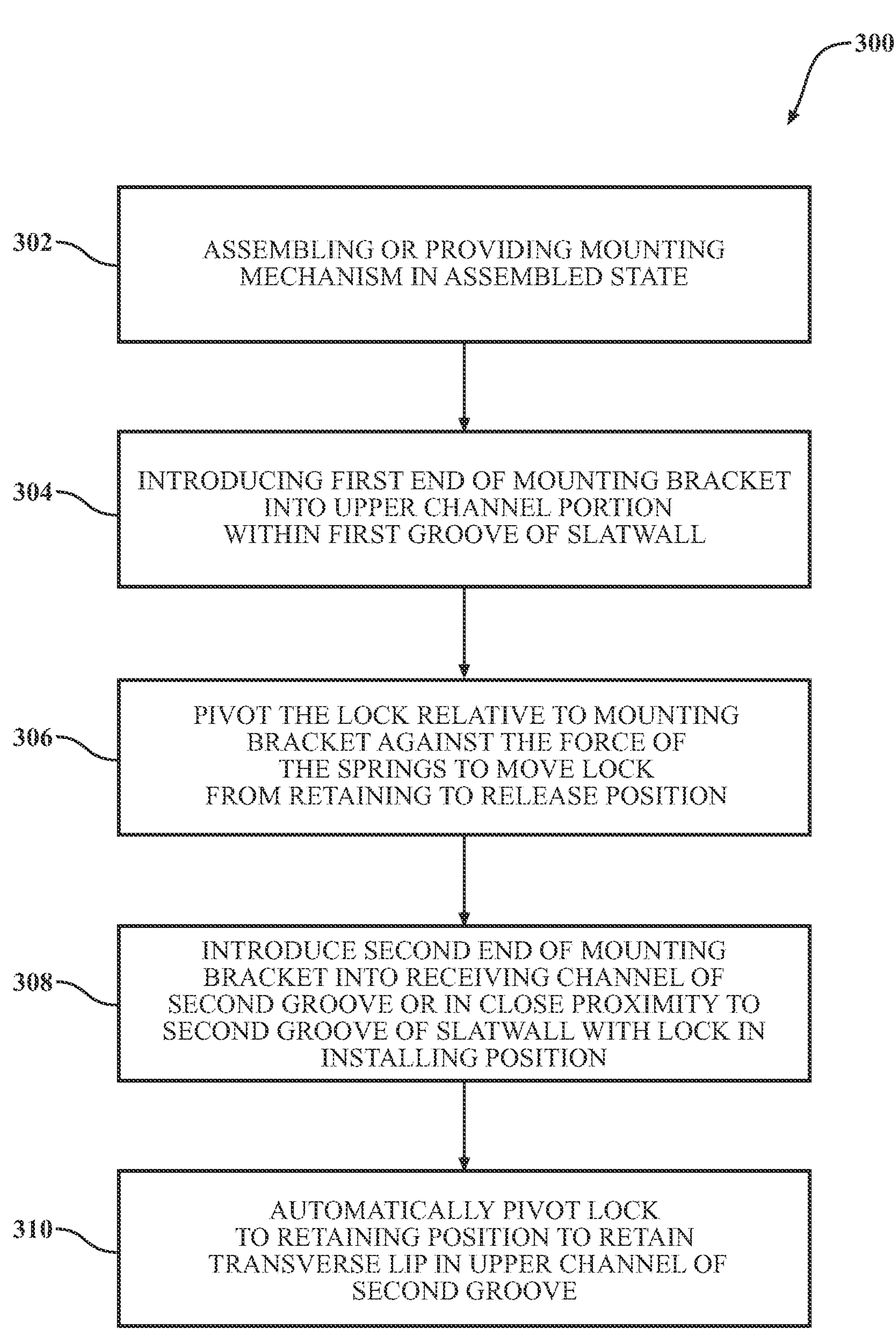
FIG. 7 is a logic flow diagram for reversibly mounting the mounting mechanism of the subject disclosure to a slatwall.

Referring now to FIG. 7, the method 300 for reversibly mounting the mounting mechanism 40 to the slatwall 20 begins in step 302 by wherein the mounting mechanism 40 is assembled or otherwise provided in an assembled state.

Next, in step 304, corresponding either embodiment of FIGS. 1A and 1B, the first end 54 of the mounting bracket 50 is disposed/introduced within the channel 33, and in particular is disposed within the open channel portion 34 and upper channel portion 36 of a first one 30A of the plurality of grooves 30 of the slatwall 20.

Next, in step 306, the latch 90 is pivoted relative to the mounting bracket 50 against the bias of the springs 150 to move the latch 90 from the retaining position to the release position. In particular, while pivoting the mounting bracket 50, a force is applied to the latch 90 to move the latch 90 against the springs 150 from the retaining position to the release position. As a part of step 306, the stop 110 is brought to a position out of contact with the bezel 70 and between the slatwall 20 and the bezel 70 in the release position.

Next, in step 308, the mounting bracket 50 is pivoted such that the latch 90 is disposed within the channel 33 of the second one 30B of the plurality of grooves 30 of the slatwall 20, and more in particular such that the flange portion 94 and transverse lip 96 are disposed within the open channel portion 34 of the second one 30B of the plurality of grooves 30 of the slatwall 20.

In embodiments such as provided in FIGS. 2A, 2C and 5, the second end 56 of the mounting bracket 50 (according to the configuration of the embodiment of FIGS. 1 and 4) is introduced and disposed within the open channel portion 34 of a second one 30B of the plurality of grooves 30 while maintaining the latch 90 in the release position.

Alternatively, in embodiment such as in FIG. 2B, the second end 56 of the mounting bracket 50 (according to the configuration of the embodiment of FIG. 1B) is not introduced and disposed within the open channel portion 34 of a second one 30B of the plurality of grooves 30, but is instead brought into close proximity with the outward surface 22 of the slatwall 20 beneath or in close proximity to the second one 30B of the plurality of grooves 30 during the pivoting step 308 as best shown in FIG. 2B.

Next, in step 310, the latch 90 is automatically pivoted relative to the mounting bracket 50 to return the latch 90 to the retaining position. In particular, the force is removed from the outward side 99 of the base portion 92 of the latch 90 to automatically return the latch 90 to the retaining position from the release position with the second end 56 remaining disposed in the open channel portion 34 of the second one 30B of the plurality of grooves 30 according to the embodiments of FIG. 2A or 2C or 5, or otherwise remaining positioned in close proximity with the outward surface of the slatwall 20 beneath or in close proximity to the second one 30B of the plurality of grooves 30 as in the embodiment of FIG. 2B, as a result of the force applied by the biasing members 150 (and in particular to the resistive force of the bar portion 154 of each respective spring 150 to pivot the latch 90 as described above). As a part of step 310 and in either of the embodiments of FIG. 2A or 2C or 5, and 2B, the transverse lip 96 of the latch 90 moves into and is disposed and retained in the upper channel portion 36 of the second one 30B of the plurality of grooves 30, and the stop 110 brought into engaging contact with the bezel 70 in a direction away the slatwall 20 and between the slatwall 20 and the bezel 70, with the stop 110 in engaging contact with the bezel 70 preventing further rotation of the latch 90 against the force of the springs 150. In this position, the mounting mechanism 40 is reversibly mounted to the slatwall 20, and the user may then utilize the hooks 200 as desired to store articles as desired.

Figure 8:
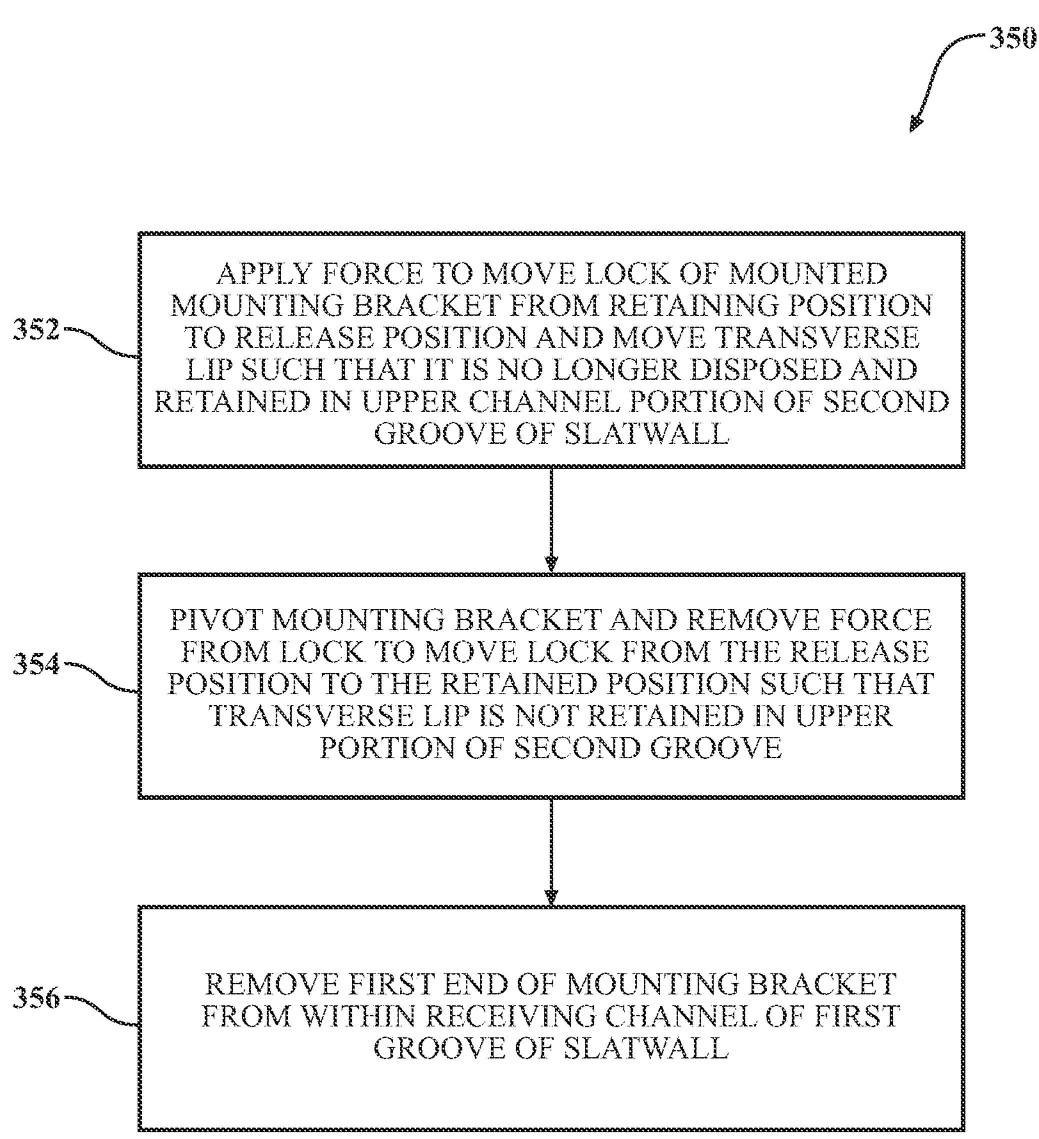
FIG. 8 is a logic flow diagram for unmounting the mounting mechanism from the slatwall as provided after step 310 of FIG. 7.

The subject disclosure also provides an associated method 350 for unmounting the mounting mechanism 40 from the slatwall 20 as illustrated in the logic flow diagram of FIG. 8, in which the steps provided in FIG. 7 are done in reverse order and in an opposite manner to that provided in FIG. 7.

Referring to FIG. 8, the method 350 for unmounting the mounting mechanism 40 from the slatwall 20 begins in step 352 wherein force is applied to the latch 90 to move the latch 90 against the resistive force of the bar portion 154 of the biasing members 150 from the retaining position to the release position while the second end 56 is disposed in the open channel portion 34 of the second one 30B of the plurality of grooves 30 as in FIGS. 2A and 2C and 5, or otherwise remains in close proximity to the outer surface of the slatwall 20 adjacent to the second one 30B of the plurality of grooves 30 as in FIG. 2B. As a part of step 352, the transverse lip 96 of the latch 90 moves and is no longer disposed and retained in the upper channel portion 36 of the second one 30B of the plurality of grooves 30, and the stop 110 is moved to a position spaced from the bezel 70 in a direction towards from the slatwall 20.

Next, in step 354, the mounting bracket 50 is pivoted and the force is removed from the latch 90, thereby moving the latch 90 from the release position to the retaining position. As a result of the pivoting of the mounting bracket 50, the transverse lip 96 will no longer be retained in the upper channel portion 36 of the second one 30B of the plurality of grooves 30 in the slatwall 20 even when the latch 90 returns to the retaining position.

Also, as a part of step 354, the stop 110 is automatically pivoted back to a position adjacent to the bezel 70 in the retained position by the resisting force of the bar portions 154 of the springs 150, with the contacting of the stop 110 to the bezel 70 preventing further rotation of the latch 90 against the force of the springs 150. Also, as a part of step 354 in the embodiment of FIGS. 2A and 2C and 5, the second end 56 of the mounting bracket 50 is moved away from the slatwall 20 such that it is no longer disposed within the open channel portion 34 of the second one 30B of the plurality of grooves 30. In the embodiment of FIG. 2B and as a part of step 354, the second end 56 of the mounting bracket 50 is similarly pivoted such that is spaced from the slatwall 20 and similarly spaced from the second one 30B of the plurality of grooves 30.

In step 356, and in any of the embodiments of FIGS. 2A-2C and 5, the first end 54 of the mounting bracket 50 is removed from within the open channel portion 34 and is no longer disposed within the upper channel portion 36 of a first one 30A of the plurality of grooves 30 of the slatwall 20.

The subject disclosure this provides mounting mechanisms that are easy for a user to install, and subsequently uninstall, from a slatwall by simple movement of the latch between retaining and release positions. Once installed with the latch in the retaining position, the mounting mechanisms and securely fastened to the slatwall for the subsequent acceptance of various articles for retention. Still further, the mounting mechanisms are easily repositionable on the slatwall as desired by simply moving the latch to the release position and uninstalling the mounting mechanism, moving, and reinstalling the mounting mechanism with the latch returned to the retaining position as desired. Still further, by providing such mounting mechanisms with hooks of different or varied sizes and shapes, articles of different sizes, shapes, and weights can be easily retained and stored by the user.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A mounting mechanism configured to support an accessory on a slatwall, the slatwall defining a plurality of spaced apart grooves, with each of the plurality of grooves defining a channel, said mounting mechanism comprising:
- a mounting bracket having a body portion extending between a first end and a second end with said first end configured for receipt and retention within the channel of a first one of the plurality of grooves and with said second end spaced from said first end and with said body portion defining an opening,
- a latch at least partially disposed within said opening and pivotally coupled to said mounting bracket and moveable between a retaining position and a release position,
- a bezel retained within said opening of said mounting bracket, with said latch pivotally coupled to said mounting bracket through said bezel, and
- a biasing member coupled to said latch for biasing said latch to said retaining position,
- wherein said latch is configured to engage the channel of a second one of the plurality of grooves when said mounting bracket is disposed within the channel of the first one of the plurality of grooves and when said latch is in said retaining position.

2. The mounting mechanism of claim 1, wherein said second end of said mounting bracket is configured to engage the channel of the second one of the plurality of grooves when said mounting bracket is disposed within the channel of the first one of the plurality of grooves and when said latch is engaged within the channel of the second one of the plurality of grooves when said latch is in said retaining position.

3. The mounting mechanism of claim 1, wherein said latch includes a base portion and a flange portion extending from said base portion with said flange portion configured to engage the channel of the second one of the plurality of grooves.

4. The mounting mechanism of claim 3, wherein said flange portion is adjacent to said second end of said mounting bracket.

5. The mounting mechanism of claim 3, wherein said latch further includes a lip extending transverse from said flange portion opposite said base portion.

6. The mounting mechanism of claim 1, wherein said bezel includes a top edge portion, a bottom edge portion, and a pair of spaced apart sidewall portions defining a bezel opening with said latch disposed within said bezel opening.

7. The mounting mechanism of claim 1, wherein said mounting mechanism further comprises a pivot pin mounted to said bezel with said latch pivotally mounted to said pivot pin.

8. The mounting mechanism of claim 7, wherein said biasing member is disposed about said pivot pin.

9. The mounting mechanism of claim 1, wherein said latch includes a stop to restrict rotation of said latch when said stop engages said bezel.

10. The mounting mechanism of claim 1, wherein said body portion further defines an accessory opening spaced from said opening, wherein said mounting mechanism further comprises said accessory coupled to said body portion, said accessory including a retaining feature and a hooking feature extending from said retaining feature, and wherein said retaining feature is configured to be positioned between said body portion and the slatwall and wherein said body portion is configured to be positioned between said hooking feature and the slatwall when the mounting mechanism is mounted to the slatwall.

11. The mounting mechanism of claim 1, wherein said body portion defines a pair of spaced apart accessory openings each spaced from said opening, wherein said mounting mechanism further comprises said accessory coupled to said body portion, said accessory including a retaining feature and a pair of hooking features extending from opposite ends of said retaining feature, and wherein each one of said pair of hooking features extends through a respective one of said pair of spaced apart accessory openings with said retaining feature configured to be positioned between said body portion and the slatwall when the mounting mechanism is mounted to the slatwall.

12. A system comprising:

a slatwall defining a plurality of spaced apart grooves, with each of the plurality of grooves defining a channel; and a mounting mechanism reversibly mounted to said slatwall and configured to support an accessory on said slatwall, said mounting mechanism comprising:

a mounting bracket having a body portion extending between a first end and a second end with said first end configured for receipt and retention within the channel of a first one of the plurality of grooves and with said second end spaced from said first end and with said body portion defining an opening, a latch at least partially disposed within said opening and pivotally coupled to said mounting bracket and moveable between a retaining position and a release position, a bezel retained within said opening of said mounting bracket, with said latch pivotally coupled to said mounting bracket through said bezel, and a biasing member coupled to said latch for biasing said latch to said retaining position, wherein said latch is configured to engage the channel of a second one of the plurality of grooves when said mounting bracket is disposed within the channel of the first one of the plurality of grooves and when said latch is in said retaining position.

13. The system of claim 12, wherein said second end of said mounting bracket is configured to engage the channel of the second one of the plurality of grooves when said mounting bracket is disposed within the channel of the first one of the plurality of grooves and when said latch is engaged within the channel of the second one of the plurality of grooves.

14. The system of claim 12, wherein said latch includes a base portion and a flange portion extending from said base portion and a lip extending transverse from said flange portion opposite said base portion;

wherein said lip is disposed and retained within said channel of said second one of the plurality of grooves when said first end of said mounting bracket is within said channel of said first one of said plurality of grooves and when said latch is in said retaining position, and wherein said lip is not retained within said channel of said second one of said plurality of grooves when said first end of said mounting bracket is within said channel of said first one of said plurality of grooves and when said latch is in said release position.

15. The system of claim 14, wherein said body portion further defines an accessory opening spaced from said opening, wherein said mounting mechanism further comprises the accessory coupled to said body portion, the accessory including a retaining feature and at least one hooking feature extending from said retaining feature, and wherein said retaining feature is positioned between said body portion and the slatwall and wherein said body portion is positioned between said at least one hooking feature and the slatwall when the mounting mechanism is mounted to the slatwall.

16. The system of claim 12, wherein said latch includes a stop to restrict rotation of said latch when said stop engages said bezel.

* * * * *